US012659636B2

(12) United States Patent
Chilles et al.

(10) Patent No.: US 12,659,636 B2
(45) Date of Patent: Jun. 16, 2026

(54) ACOUSTIC TRANSDUCER MOUNTS

(71) Applicant: SIM IP HXR LLC, Sunny Isles Beach, FL (US)

(72) Inventors: Jamie Chilles, Bristol (GB); Rachael McPhillips, Bristol (GB); Vijay Dontu, Bristol (GB); Dan Sweeney, Cardiff (GB)

(73) Assignee: SIM IP HXR LLC, Sunny Isles Beach, FL (US)

( * ) Notice: Subject to any disclaimer, the term of this patent is extended or adjusted under 35 U.S.C. 154(b) by 107 days.

(21) Appl. No.: 18/481,000

(22) Filed: Oct. 4, 2023

(65) Prior Publication Data

US 2024/0129655 A1 Apr. 18, 2024

Related U.S. Application Data

(60) Provisional application No. 63/381,005, filed on Oct. 26, 2022, provisional application No. 63/380,749, (Continued)

(51) Int. Cl.
*H04R 1/02* (2006.01)
*G08B 6/00* (2006.01)

(52) U.S. Cl.
CPC *H04R 1/02* (2013.01); *G08B 6/00* (2013.01)

(58) Field of Classification Search
CPC .. H04R 1/02; G08B 6/00; G06F 3/016; H05K 1/028; H05K 1/118; H05K 1/189;

(Continued)

(56) References Cited

U.S. PATENT DOCUMENTS 4,218,921 A 8/1980 Berge
4,760,525 A 7/1988 Webb (Continued)

FOREIGN PATENT DOCUMENTS

CA 2470115 A1 6/2003
CA 2909804 A1 11/2014

(Continued)

OTHER PUBLICATIONS

ISR and WO for PCT/GB2020/052829 (Feb. 10, 2021) (15 pages).

(Continued)

*Primary Examiner* — Daniel Pihulic
(74) *Attorney, Agent, or Firm* — ALSTON & BIRD LLP

(57) ABSTRACT

A flexible transducer designed with high volume manufacturing in mind is described, the where flexible transducer mount can be panelized into a grid form and the transducers assembled into the grid using commercially available pick-and-place tools. Once assembled, the mounted transducers may be attached to circuit boards using surface mount processes such as solder reflow or adhesive bonding via the electrical contacts on the underside of the flexible transducer mount. Further, maximization of the oscillating internal surface area that contributes to the acoustic pressure for a given transducer footprint area is described, which leads to greater packing density of transducers when used in an ultrasonic array. The greater packing density and pressure generated by the transducer aids with the miniaturization and cost reduction of mid-air haptic technology. The increase in acoustic power generation per unit area of transducer-occupied surface or footprint provides the possibility of producing transducers that are critically spaced.

20 Claims, 28 Drawing Sheets

Related U.S. Application Data filed on Oct. 24, 2022, provisional application No. 63/379,140, filed on Oct. 11, 2022.

(58) Field of Classification Search
CPC .. H05K 2201/09063; H05K 2201/2009; B06B 1/0292; B06B 1/06; B06B 1/02; G10K 11/004
See application file for complete search history.

(56) References Cited

U.S. PATENT DOCUMENTS

| | | | |
|---|---|---|---|
| 4,771,205 | A | 9/1988 | Mequio |
| 4,881,212 | A | 11/1989 | Takeuchi |
| 5,122,993 | A | 6/1992 | Hikita |
| 5,226,000 | A | 7/1993 | Moses |
| 5,235,986 | A | 8/1993 | Maslak |
| 5,243,344 | A | 9/1993 | Koulopoulos |
| 5,329,682 | A | 7/1994 | Thurn |
| 5,371,834 | A | 12/1994 | Tawel |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,729,694 | A | 3/1998 | Holzrichter |
| 5,859,915 | A | 1/1999 | Norris |
| 6,029,518 | A | 2/2000 | Oeftering |
| 6,193,936 | B1 | 2/2001 | Gardner |
| 6,216,538 | B1 | 4/2001 | Yasuda |
| 6,436,051 | B1 | 8/2002 | Morris |
| 6,503,204 | B1 | 1/2003 | Sumanaweera |
| 6,533,455 | B2 | 3/2003 | Graumann |
| 6,647,359 | B1 | 11/2003 | Verplank |
| 6,771,294 | B1 | 8/2004 | Pulli |
| 6,772,490 | B2 | 8/2004 | Toda |
| 6,800,987 | B2 | 10/2004 | Toda |
| 7,107,159 | B2 | 9/2006 | German |
| 7,109,789 | B2 | 9/2006 | Spencer |
| 7,154,928 | B2 | 12/2006 | Sandstrom |
| 7,182,726 | B2 | 2/2007 | Williams |
| 7,225,404 | B1 | 5/2007 | Zilles |
| 7,284,027 | B2 | 10/2007 | Jennings, III |
| 7,345,600 | B1 | 3/2008 | Fedigan |
| 7,487,662 | B2 | 2/2009 | Schabron |
| 7,497,662 | B2 | 3/2009 | Mollmann |
| 7,577,260 | B1 | 8/2009 | Hooley |
| 7,692,661 | B2 | 4/2010 | Cook |
| RE42,192 | E | 3/2011 | Schabron |
| 7,966,134 | B2 | 6/2011 | German |
| 8,000,481 | B2 | 8/2011 | Nishikawa |
| 8,123,502 | B2 | 2/2012 | Blakey |
| 8,269,168 | B1 | 9/2012 | Axelrod |
| 8,279,193 | B1 | 10/2012 | Birnbaum |
| 8,351,646 | B2 | 1/2013 | Fujimura |
| 8,369,973 | B2 | 2/2013 | Risbo |
| 8,594,350 | B2 | 11/2013 | Hooley |
| 8,607,922 | B1 | 12/2013 | Werner |
| 8,782,109 | B2 | 7/2014 | Tsutsui |
| 8,823,674 | B2 | 9/2014 | Birnbaum |
| 8,833,510 | B2 | 9/2014 | Koh |
| 8,884,927 | B1 | 11/2014 | Cheatham, III |
| 9,208,664 | B1 | 12/2015 | Peters |
| 9,267,735 | B2 | 2/2016 | Funayama |
| 9,421,291 | B2 | 8/2016 | Robert |
| 9,612,658 | B2 | 4/2017 | Subramanian |
| 9,662,680 | B2 | 5/2017 | Yamamoto |
| 9,667,173 | B1 | 5/2017 | Kappus |
| 9,786,092 | B2 | 10/2017 | Santhanam |
| 9,795,446 | B2 | 10/2017 | Dimaio |
| 9,816,757 | B1 | 11/2017 | Zielinski |
| 9,841,819 | B2 | 12/2017 | Carter |
| 9,863,699 | B2 | 1/2018 | Corbin, III |
| 9,898,089 | B2 | 2/2018 | Subramanian |
| 9,936,908 | B1 | 4/2018 | Acosta |
| 9,945,818 | B2 | 4/2018 | Ganti |
| 9,958,943 | B2 | 5/2018 | Long |
| 9,977,120 | B2 | 5/2018 | Carter |
| 10,101,811 | B2 | 10/2018 | Carter |
| 10,101,814 | B2 | 10/2018 | Carter |
| 10,133,353 | B2 | 11/2018 | Eid |
| 10,140,776 | B2 | 11/2018 | Schwarz |
| 10,146,353 | B1 | 12/2018 | Smith |
| 10,168,782 | B1 | 1/2019 | Tchon |
| 10,268,275 | B2 | 4/2019 | Carter |
| 10,281,567 | B2 | 5/2019 | Carter |
| 10,318,008 | B2 | 6/2019 | Sinha |
| 10,383,694 | B1 | 8/2019 | Venkataraman |
| 10,444,842 | B2 | 10/2019 | Long |
| 10,469,973 | B2 | 11/2019 | Hayashi |
| 10,496,175 | B2 | 12/2019 | Long |
| 10,497,358 | B2 | 12/2019 | Tester |
| 10,510,357 | B2 | 12/2019 | Kovesi |
| 10,520,252 | B2 | 12/2019 | Momen |
| 10,523,159 | B2 | 12/2019 | Megretski |
| 10,531,212 | B2 | 1/2020 | Long |
| 10,535,174 | B1 | 1/2020 | Rigiroli |
| 10,569,300 | B2 | 2/2020 | Hoshi |
| 10,593,101 | B1 | 3/2020 | Han |
| 10,599,434 | B1 | 3/2020 | Barrett |
| 10,657,704 | B1 | 5/2020 | Han |
| 10,685,538 | B2 | 6/2020 | Carter |
| 10,755,538 | B2 | 8/2020 | Carter |
| 10,818,162 | B2 | 10/2020 | Carter |
| 10,911,861 | B2 | 2/2021 | Buckland |
| 10,915,177 | B2 | 2/2021 | Carter |
| 10,921,890 | B2 | 2/2021 | Subramanian |
| 10,930,123 | B2 | 2/2021 | Carter |
| 10,943,578 | B2 | 3/2021 | Long |
| 10,991,074 | B2 | 4/2021 | Bousmalis |
| 11,048,329 | B1 | 6/2021 | Lee |
| 11,080,874 | B1 | 8/2021 | Bardagjy |
| 11,098,951 | B2 | 8/2021 | Kappus |
| 11,106,273 | B2 | 8/2021 | Hazra |
| 11,113,860 | B2 | 9/2021 | Rigiroli |
| 11,125,866 | B2 | 9/2021 | Sumi |
| 11,169,610 | B2 | 11/2021 | Sarafianou |
| 11,189,140 | B2 | 11/2021 | Long |
| 11,204,644 | B2 | 12/2021 | Long |
| 11,276,281 | B2 | 3/2022 | Carter |
| 11,334,165 | B1 | 5/2022 | Clements |
| 11,350,909 | B2 | 6/2022 | Maresca |
| 11,475,247 | B2 | 10/2022 | Nikolenko |
| 11,531,395 | B2 | 12/2022 | Kappus |
| 11,543,507 | B2 | 1/2023 | Carter |
| 11,550,395 | B2 | 1/2023 | Beattie |
| 11,550,432 | B2 | 1/2023 | Carter |
| 11,553,295 | B2 | 1/2023 | Kappus |
| 11,669,661 | B2 | 6/2023 | Mirzendehdel |
| 11,693,113 | B2 | 7/2023 | Bachmann |
| 11,704,983 | B2 | 7/2023 | Long |
| 11,714,492 | B2 | 8/2023 | Carter |
| 11,715,453 | B2 | 8/2023 | Kappus |
| 11,727,790 | B2 | 8/2023 | Carter |
| 11,740,018 | B2 | 8/2023 | Kappus |
| 11,742,870 | B2 | 8/2023 | Long |
| 11,768,540 | B2 | 9/2023 | Long |
| 11,816,267 | B2 | 11/2023 | Kappus |
| 11,830,351 | B2 | 11/2023 | Carter |
| 11,830,352 | B1 | 11/2023 | Agrawal |
| 11,842,517 | B2 | 12/2023 | Lyons |
| 11,886,639 | B2 | 1/2024 | Brown |
| 11,921,928 | B2 | 3/2024 | Iodice |
| 11,955,109 | B2 | 4/2024 | Long |
| 12,100,288 | B2 | 9/2024 | Carter |
| 12,158,522 | B2 | 12/2024 | Iodice |
| 2001/0007591 | A1 | 7/2001 | Pompei |
| 2001/0033124 | A1 | 10/2001 | Norris |
| 2001/0053204 | A1 | 12/2001 | Navab |
| 2002/0149570 | A1 | 10/2002 | Knowles |
| 2003/0024317 | A1 | 2/2003 | Miller |
| 2003/0144032 | A1 | 7/2003 | Brunner |
| 2003/0182647 | A1 | 9/2003 | Radeskog |
| 2004/0005715 | A1 | 1/2004 | Schabron |
| 2004/0014434 | A1 | 1/2004 | Haardt |
| 2004/0052387 | A1 | 3/2004 | Norris |

(56) References Cited

U.S. PATENT DOCUMENTS

| | | | |
|---|---|---|---|
| 2004/0091119 | A1 | 5/2004 | Duraiswami |
| 2004/0210158 | A1 | 10/2004 | Organ |
| 2004/0226378 | A1 | 11/2004 | Oda |
| 2004/0264707 | A1 | 12/2004 | Yang |
| 2005/0052714 | A1 | 3/2005 | Klug |
| 2005/0056851 | A1 | 3/2005 | Althaus |
| 2005/0148874 | A1 | 7/2005 | Brock-Fisher |
| 2005/0212760 | A1 | 9/2005 | Marvit |
| 2005/0226437 | A1 | 10/2005 | Pellegrini |
| 2005/0267695 | A1 | 12/2005 | German |
| 2005/0273483 | A1 | 12/2005 | Dent |
| 2006/0085049 | A1 | 4/2006 | Cory |
| 2006/0090955 | A1 | 5/2006 | Cardas |
| 2006/0091301 | A1 | 5/2006 | Trisnadi |
| 2006/0164428 | A1 | 7/2006 | Cook |
| 2007/0036492 | A1 | 2/2007 | Lee |
| 2007/0056374 | A1 | 3/2007 | Andrews |
| 2007/0094317 | A1 | 4/2007 | Wang |
| 2007/0177681 | A1 | 8/2007 | Choi |
| 2007/0214462 | A1 | 9/2007 | Boillot |
| 2007/0216711 | A1 | 9/2007 | Smith |
| 2007/0236450 | A1 | 10/2007 | Colgate |
| 2007/0263741 | A1 | 11/2007 | Erving |
| 2008/0012647 | A1 | 1/2008 | Risbo |
| 2008/0027686 | A1 | 1/2008 | Mollmann |
| 2008/0084789 | A1 | 4/2008 | Altman |
| 2008/0130906 | A1 | 6/2008 | Goldstein |
| 2008/0152191 | A1 | 6/2008 | Fujimura |
| 2008/0226088 | A1 | 9/2008 | Aarts |
| 2008/0273723 | A1 | 11/2008 | Hartung |
| 2008/0291198 | A1 | 11/2008 | Chun |
| 2008/0300055 | A1 | 12/2008 | Lutnick |
| 2009/0093724 | A1 | 4/2009 | Pernot |
| 2009/0116660 | A1 | 5/2009 | Croft, III |
| 2009/0232684 | A1 | 9/2009 | Hirata |
| 2009/0251421 | A1 | 10/2009 | Bloebaum |
| 2009/0319065 | A1 | 12/2009 | Risbo |
| 2010/0013613 | A1 | 1/2010 | Weston |
| 2010/0016727 | A1 | 1/2010 | Rosenberg |
| 2010/0030076 | A1 | 2/2010 | Vortman |
| 2010/0044120 | A1 | 2/2010 | Richter |
| 2010/0066512 | A1 | 3/2010 | Rank |
| 2010/0085168 | A1 | 4/2010 | Kyung |
| 2010/0103246 | A1 | 4/2010 | Schwerdtner |
| 2010/0109481 | A1 | 5/2010 | Buccafusca |
| 2010/0199232 | A1 | 8/2010 | Mistry |
| 2010/0231508 | A1 | 9/2010 | Cruz-Hernandez |
| 2010/0262008 | A1 | 10/2010 | Roundhill |
| 2010/0302015 | A1 | 12/2010 | Kipman |
| 2010/0321216 | A1 | 12/2010 | Jonsson |
| 2011/0006888 | A1 | 1/2011 | Bae |
| 2011/0010958 | A1 | 1/2011 | Clark |
| 2011/0051554 | A1 | 3/2011 | Varray |
| 2011/0066032 | A1 | 3/2011 | Shuki |
| 2011/0134225 | A1 | 6/2011 | Saint-Pierre |
| 2011/0199342 | A1 | 8/2011 | Vartanian |
| 2011/0310028 | A1 | 12/2011 | Camp, Jr. |
| 2012/0057733 | A1 | 3/2012 | Morii |
| 2012/0063628 | A1 | 3/2012 | Rizzello |
| 2012/0066280 | A1 | 3/2012 | Tsutsui |
| 2012/0113223 | A1 | 5/2012 | Hilliges |
| 2012/0223880 | A1 | 9/2012 | Birnbaum |
| 2012/0229400 | A1 | 9/2012 | Birnbaum |
| 2012/0229401 | A1 | 9/2012 | Birnbaum |
| 2012/0236689 | A1 | 9/2012 | Brown |
| 2012/0243374 | A1 | 9/2012 | Dahl |
| 2012/0249409 | A1 | 10/2012 | Toney |
| 2012/0249474 | A1 | 10/2012 | Pratt |
| 2012/0299853 | A1 | 11/2012 | Dagar |
| 2012/0307649 | A1 | 12/2012 | Park |
| 2012/0315605 | A1 | 12/2012 | Cho |
| 2013/0035582 | A1 | 2/2013 | Radulescu |
| 2013/0079621 | A1 | 3/2013 | Shoham |
| 2013/0094678 | A1 | 4/2013 | Scholte |
| 2013/0100008 | A1 | 4/2013 | Marti |
| 2013/0101141 | A1 | 4/2013 | Mcelveen |
| 2013/0173658 | A1 | 7/2013 | Adelman |
| 2013/0271397 | A1 | 10/2013 | Macdougall |
| 2013/0331705 | A1 | 12/2013 | Fraser |
| 2014/0027201 | A1 | 1/2014 | Islam |
| 2014/0104274 | A1 | 4/2014 | Hilliges |
| 2014/0139071 | A1 | 5/2014 | Yamamoto |
| 2014/0168091 | A1 | 6/2014 | Jones |
| 2014/0197936 | A1 * | 7/2014 | Biggs ...................... G08B 6/00 340/407.1 |
| 2014/0201666 | A1 | 7/2014 | Bedikian |
| 2014/0204002 | A1 | 7/2014 | Bennet |
| 2014/0265572 | A1 | 9/2014 | Siedenburg |
| 2014/0267065 | A1 | 9/2014 | Levesque |
| 2014/0269207 | A1 | 9/2014 | Baym |
| 2014/0269208 | A1 | 9/2014 | Baym |
| 2014/0269214 | A1 | 9/2014 | Baym |
| 2014/0270305 | A1 | 9/2014 | Baym |
| 2014/0306891 | A1 | 10/2014 | Latta |
| 2014/0320436 | A1 | 10/2014 | Modarres |
| 2014/0361988 | A1 | 12/2014 | Katz |
| 2014/0369514 | A1 | 12/2014 | Baym |
| 2015/0002477 | A1 | 1/2015 | Cheatham, III |
| 2015/0002517 | A1 | 1/2015 | Lee |
| 2015/0005039 | A1 | 1/2015 | Liu |
| 2015/0006645 | A1 | 1/2015 | Oh |
| 2015/0007025 | A1 | 1/2015 | Sassi |
| 2015/0013023 | A1 | 1/2015 | Wang |
| 2015/0019299 | A1 | 1/2015 | Harvey |
| 2015/0022466 | A1 | 1/2015 | Levesque |
| 2015/0029155 | A1 | 1/2015 | Lee |
| 2015/0066445 | A1 | 3/2015 | Lin |
| 2015/0070147 | A1 | 3/2015 | Cruz-Hernandez |
| 2015/0070245 | A1 | 3/2015 | Han |
| 2015/0078136 | A1 | 3/2015 | Sun |
| 2015/0081110 | A1 | 3/2015 | Houston |
| 2015/0084929 | A1 | 3/2015 | Lee |
| 2015/0110310 | A1 | 4/2015 | Minnaar |
| 2015/0130323 | A1 | 5/2015 | Harris |
| 2015/0168205 | A1 | 6/2015 | Lee |
| 2015/0187134 | A1 | 7/2015 | Baecher |
| 2015/0192995 | A1 | 7/2015 | Subramanian |
| 2015/0209564 | A1 | 7/2015 | Lewin |
| 2015/0220199 | A1 | 8/2015 | Wang |
| 2015/0226537 | A1 | 8/2015 | Schorre |
| 2015/0226831 | A1 | 8/2015 | Nakamura |
| 2015/0241393 | A1 | 8/2015 | Ganti |
| 2015/0248787 | A1 | 9/2015 | Abovitz |
| 2015/0258431 | A1 | 9/2015 | Stafford |
| 2015/0277610 | A1 | 10/2015 | Kim |
| 2015/0293592 | A1 | 10/2015 | Cheong |
| 2015/0304789 | A1 | 10/2015 | Babayoff |
| 2015/0309629 | A1 | 10/2015 | Amariutei |
| 2015/0323667 | A1 | 11/2015 | Przybyla |
| 2015/0331576 | A1 | 11/2015 | Piya |
| 2015/0332075 | A1 | 11/2015 | Burch |
| 2016/0019762 | A1 | 1/2016 | Levesque |
| 2016/0019879 | A1 | 1/2016 | Daley |
| 2016/0026253 | A1 | 1/2016 | Bradski |
| 2016/0044417 | A1 | 2/2016 | Clemen, Jr. |
| 2016/0124080 | A1 | 5/2016 | Carter |
| 2016/0138986 | A1 | 5/2016 | Carlin |
| 2016/0175701 | A1 | 6/2016 | Froy |
| 2016/0175709 | A1 | 6/2016 | Idris |
| 2016/0189702 | A1 | 6/2016 | Blanc |
| 2016/0242724 | A1 | 8/2016 | Lavallee |
| 2016/0246374 | A1 | 8/2016 | Carter |
| 2016/0249150 | A1 | 8/2016 | Carter |
| 2016/0291716 | A1 | 10/2016 | Boser |
| 2016/0306423 | A1 | 10/2016 | Uttermann |
| 2016/0320843 | A1 | 11/2016 | Long |
| 2016/0339132 | A1 | 11/2016 | Cosman |
| 2016/0358477 | A1 | 12/2016 | Ansari |
| 2016/0374562 | A1 | 12/2016 | Vertikov |
| 2017/0002839 | A1 | 1/2017 | Bukland |
| 2017/0004819 | A1 | 1/2017 | Ochiai |
| 2017/0018171 | A1 | 1/2017 | Carter |
| 2017/0024921 | A1 | 1/2017 | Beeler |
| 2017/0052148 | A1 | 2/2017 | Estevez |

(56) References Cited

U.S. PATENT DOCUMENTS

| | | | |
|---|---|---|---|
| 2017/0123487 | A1 | 5/2017 | Hazra |
| 2017/0123499 | A1 | 5/2017 | Eid |
| 2017/0140552 | A1 | 5/2017 | Woo |
| 2017/0144190 | A1 | 5/2017 | Hoshi |
| 2017/0153707 | A1 | 6/2017 | Subramanian |
| 2017/0168586 | A1 | 6/2017 | Sinha |
| 2017/0181725 | A1 | 6/2017 | Han |
| 2017/0193768 | A1 | 7/2017 | Long |
| 2017/0193823 | A1 | 7/2017 | Jiang |
| 2017/0211022 | A1 | 7/2017 | Reinke |
| 2017/0236506 | A1 | 8/2017 | Przybyla |
| 2017/0249932 | A1 | 8/2017 | Maxwell |
| 2017/0270356 | A1 | 9/2017 | Sills |
| 2017/0279951 | A1 | 9/2017 | Hwang |
| 2017/0336860 | A1 | 11/2017 | Smoot |
| 2017/0366908 | A1 | 12/2017 | Long |
| 2018/0018787 | A1 | 1/2018 | Giancola |
| 2018/0035891 | A1 | 2/2018 | Van Soest |
| 2018/0039333 | A1 | 2/2018 | Carter |
| 2018/0047259 | A1 | 2/2018 | Carter |
| 2018/0074580 | A1 | 3/2018 | Hardee |
| 2018/0081439 | A1 | 3/2018 | Daniels |
| 2018/0101234 | A1 | 4/2018 | Carter |
| 2018/0139557 | A1 | 5/2018 | Ochiai |
| 2018/0146306 | A1 | 5/2018 | Benattar |
| 2018/0151035 | A1 | 5/2018 | Maalouf |
| 2018/0166063 | A1 | 6/2018 | Long |
| 2018/0181203 | A1 | 6/2018 | Subramanian |
| 2018/0182372 | A1 | 6/2018 | Tester |
| 2018/0190007 | A1 | 7/2018 | Panteleev |
| 2018/0246576 | A1 | 8/2018 | Long |
| 2018/0253627 | A1 | 9/2018 | Baradel |
| 2018/0263708 | A1 | 9/2018 | Kim |
| 2018/0267156 | A1 | 9/2018 | Carter |
| 2018/0271494 | A1 | 9/2018 | Cuscuna |
| 2018/0304310 | A1 | 10/2018 | Long |
| 2018/0309515 | A1 | 10/2018 | Murakowski |
| 2018/0310111 | A1 | 10/2018 | Kappus |
| 2018/0350339 | A1 | 12/2018 | Macours |
| 2018/0361174 | A1 | 12/2018 | Radulescu |
| 2019/0001129 | A1 | 1/2019 | Rosenbluth |
| 2019/0038496 | A1 | 2/2019 | Levesque |
| 2019/0091565 | A1 | 3/2019 | Nelson |
| 2019/0163275 | A1 | 5/2019 | Iodice |
| 2019/0175077 | A1 | 6/2019 | Zhang |
| 2019/0187244 | A1 | 6/2019 | Riccardi |
| 2019/0196578 | A1 | 6/2019 | Iodice |
| 2019/0196591 | A1 | 6/2019 | Long |
| 2019/0197840 | A1 | 6/2019 | Kappus |
| 2019/0197841 | A1 | 6/2019 | Carter |
| 2019/0197842 | A1 | 6/2019 | Long |
| 2019/0204925 | A1 | 7/2019 | Long |
| 2019/0206202 | A1 | 7/2019 | Carter |
| 2019/0235628 | A1 | 8/2019 | Lacroix |
| 2019/0257932 | A1 | 8/2019 | Carter |
| 2019/0310710 | A1 | 10/2019 | Deeley |
| 2019/0342654 | A1 | 11/2019 | Buckland |
| 2020/0042091 | A1 | 2/2020 | Long |
| 2020/0080776 | A1 | 3/2020 | Kappus |
| 2020/0082221 | A1 | 3/2020 | Tsai |
| 2020/0082804 | A1 | 3/2020 | Kappus |
| 2020/0103974 | A1 | 4/2020 | Carter |
| 2020/0117229 | A1 | 4/2020 | Long |
| 2020/0117993 | A1 | 4/2020 | Martinez-Canales |
| 2020/0193269 | A1 | 6/2020 | Park |
| 2020/0218354 | A1 | 7/2020 | Beattie |
| 2020/0257371 | A1 | 8/2020 | Sung |
| 2020/0285888 | A1 | 9/2020 | Borar |
| 2020/0294299 | A1 | 9/2020 | Rigiroli |
| 2020/0302760 | A1 | 9/2020 | Carter |
| 2020/0320347 | A1 | 10/2020 | Nikolenko |
| 2020/0320351 | A1 | 10/2020 | Nikolenko |
| 2020/0327418 | A1 | 10/2020 | Lyons |
| 2020/0380832 | A1 | 12/2020 | Carter |
| 2021/0037332 | A1 | 2/2021 | Kappus |
| 2021/0043070 | A1 | 2/2021 | Carter |
| 2021/0056693 | A1 | 2/2021 | Cheng |
| 2021/0109712 | A1 | 4/2021 | Oliver |
| 2021/0111731 | A1 | 4/2021 | Oliver |
| 2021/0112353 | A1 | 4/2021 | Brian |
| 2021/0141458 | A1 | 5/2021 | Sarafianou |
| 2021/0162457 | A1 | 6/2021 | Ebefors |
| 2021/0165491 | A1 | 6/2021 | Sun |
| 2021/0170447 | A1 | 6/2021 | Buckland |
| 2021/0183215 | A1 | 6/2021 | Carter |
| 2021/0201884 | A1 | 7/2021 | Kappus |
| 2021/0225355 | A1 | 7/2021 | Long |
| 2021/0275141 | A1 | 9/2021 | Eckersley |
| 2021/0294419 | A1 | 9/2021 | Lee |
| 2021/0303072 | A1 | 9/2021 | Carter |
| 2021/0303758 | A1 | 9/2021 | Long |
| 2021/0334706 | A1 | 10/2021 | Yamaguchi |
| 2021/0381765 | A1 | 12/2021 | Kappus |
| 2021/0397261 | A1 | 12/2021 | Kappus |
| 2022/0000447 | A1 | 1/2022 | Eibl |
| 2022/0035479 | A1 | 2/2022 | Lasater |
| 2022/0083142 | A1 | 3/2022 | Brown |
| 2022/0095068 | A1 | 3/2022 | Kappus |
| 2022/0113806 | A1 | 4/2022 | Long |
| 2022/0155949 | A1 | 5/2022 | Ring |
| 2022/0198892 | A1 | 6/2022 | Carter |
| 2022/0236806 | A1 | 7/2022 | Carter |
| 2022/0252550 | A1 | 8/2022 | Catsis |
| 2022/0300028 | A1 | 9/2022 | Long |
| 2022/0300070 | A1 | 9/2022 | Iodice |
| 2022/0329250 | A1 | 10/2022 | Long |
| 2022/0393095 | A1 | 12/2022 | Chilles |
| 2023/0036123 | A1 | 2/2023 | Long |
| 2023/0075917 | A1 | 3/2023 | Pittera |
| 2023/0087395 | A1 | 3/2023 | Borar |
| 2023/0117919 | A1 | 4/2023 | Michele |
| 2023/0124704 | A1 | 4/2023 | Rorke |
| 2023/0141896 | A1 | 5/2023 | Liu |
| 2023/0168228 | A1 | 6/2023 | Brian |
| 2023/0215248 | A1 | 7/2023 | Lowther |
| 2023/0228857 | A1 | 7/2023 | Carter |
| 2023/0251720 | A1 | 8/2023 | William |
| 2023/0259213 | A1 | 8/2023 | Long |
| 2023/0298444 | A1 | 9/2023 | Kappus |
| 2023/0360504 | A1 | 11/2023 | Kappus |
| 2023/0368771 | A1 | 11/2023 | Kappus |
| 2023/0378966 | A1 | 11/2023 | Long |
| 2024/0021072 | A1 | 1/2024 | Carter |
| 2024/0036652 | A1 | 2/2024 | Yamada |
| 2024/0056655 | A1 | 2/2024 | Page |
| 2024/0069640 | A1 | 2/2024 | Long |
| 2024/0095953 | A1 | 3/2024 | Lyons |
| 2024/0096183 | A1 | 3/2024 | Carter |
| 2024/0129655 | A1* | 4/2024 | Chilles ...................... B06B 1/02 |
| 2024/0135789 | A1 | 4/2024 | Long |
| 2024/0157399 | A1 | 5/2024 | Buckland |
| 2024/0231492 | A1 | 7/2024 | Beattie |
| 2024/0265907 | A1 | 8/2024 | Long |
| 2024/0288945 | A1 | 8/2024 | Long |
| 2024/0296825 | A1 | 9/2024 | Long |
| 2024/0402809 | A1 | 12/2024 | Kappus |
| 2024/0402996 | A1 | 12/2024 | Long |
| 2024/0411374 | A1 | 12/2024 | Wren |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 | A | 8/2014 |
| CN | 107340871 | A | 11/2017 |
| CN | 107407969 | A | 11/2017 |
| CN | 107534810 | A | 1/2018 |
| CN | 108780642 | A | 11/2018 |
| CN | 116034422 | A | 4/2023 |
| EP | 0057594 | A2 | 8/1982 |
| EP | 309003 | | 3/1989 |
| EP | 0696670 | A1 | 2/1996 |

(56) References Cited

FOREIGN PATENT DOCUMENTS

| | | | | |
|---|---|---|---|---|
| EP | 1875081 | A1 | 1/2008 | |
| EP | 1911530 | | 4/2008 | |
| EP | 2271129 | A1 | 1/2011 | |
| EP | 1461598 | B1 | 4/2014 | |
| EP | 3207817 | A1 | 8/2017 | |
| EP | 3216231 | B1 | 8/2019 | |
| EP | 3916525 | | 12/2021 | |
| GB | 2464117 | | 4/2010 | |
| GB | 2513884 | A | 11/2014 | |
| GB | 2530036 | | 3/2016 | |
| JP | 2008074075 | | 4/2008 | |
| JP | 2010109579 | | 5/2010 | |
| JP | 2011172074 | | 9/2011 | |
| JP | 2012048378 | A | 3/2012 | |
| JP | 5477736 | B2 | 4/2014 | |
| JP | 2015035657 | A | 2/2015 | |
| JP | 2016035646 | | 3/2016 | |
| JP | 2017168086 | | 9/2017 | |
| JP | 6239796 | | 11/2017 | |
| KR | 20120065779 | | 6/2012 | |
| KR | 20130055972 | | 5/2013 | |
| KR | 1020130055972 | | 5/2013 | |
| KR | 20160008280 | | 1/2016 | |
| KR | 20200082449 | A | 7/2020 | |
| TW | 201308837 | | 2/2013 | |
| WO | 9118486 | | 11/1991 | |
| WO | 9639754 | | 12/1996 | |
| WO | 03050511 | A | 6/2003 | |
| WO | 2005017965 | | 2/2005 | |
| WO | 2007144801 | A2 | 12/2007 | |
| WO | 2009071746 | A1 | 6/2009 | |
| WO | 2009112866 | | 9/2009 | |
| WO | 2010003836 | | 1/2010 | |
| WO | 2010139916 | | 12/2010 | |
| WO | 2011132012 | A1 | 10/2011 | |
| WO | 2012023864 | | 2/2012 | |
| WO | 2012104648 | A1 | 8/2012 | |
| WO | 2013179179 | | 12/2013 | |
| WO | 2014181084 | A1 | 11/2014 | |
| WO | 2015006467 | | 1/2015 | |
| WO | 2015039622 | | 3/2015 | |
| WO | 2015127335 | | 8/2015 | |
| WO | 2015194510 | | 12/2015 | |
| WO | 2016007920 | | 1/2016 | |
| WO | 2016073936 | | 5/2016 | |
| WO | 2016095033 | A1 | 6/2016 | |
| WO | 2016099279 | | 6/2016 | |
| WO | 2016132141 | | 8/2016 | |
| WO | 2016132144 | | 8/2016 | |
| WO | 2016137675 | | 9/2016 | |
| WO | 2016162058 | | 10/2016 | |
| WO | 2016171651 | | 10/2016 | |
| WO | 2017172006 | | 10/2017 | |
| WO | 2018000731 | A1 | 1/2018 | |
| WO | 2018109466 | A1 | 6/2018 | |
| WO | 2018168562 | A1 | 9/2018 | |
| WO | 2019190894 | | 10/2019 | |
| WO | 2020049321 | A2 | 3/2020 | |
| WO | 2021130505 | A1 | 7/2021 | |
| WO | 2021260373 | A1 | 12/2021 | |
| WO | 2021262343 | | 12/2021 | |
| WO | WO-2024079446 | A1 * | 4/2024 | ............... B06B 1/02 |

OTHER PUBLICATIONS

ISR and WO for PCT/GB2021/052415 (Dec. 22, 2021) (16 pages).
ISR and WO for PCT/GB2023/050001 (May 24, 2023) (20 pages).
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al., "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada. 5 pages.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017) 5 pages.
Keisuke Hasegawa, Midair Ultrasound Fragrance Rendering, IEEE Transactions on Visualization and Computer Graphics, vol. 24, No. 4, Apr. 2018 1477. 9 pages.
Keisuke Hasegawa,, Curved acceleration path of ultrasound-driven air flow, J. Appl. Phys. 125, 054902 (2019); 6 pages.
Ken Wada, Ring Buffer Basics (2013) 6 pages.
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al., Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547. 2 pages.
M. Barmatz et al, "Acoustic radiation potential on a sphere in plane, cylindrical, and spherical standing wave fields", The Journal of the Acoustical Society of America, New York, NY, US, (19850301), vol. 77, No. 3, pp. 928-945, XP055389249.

(56) References Cited

OTHER PUBLICATIONS

M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al., "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018. 13 pages.
Mohamed Yacine Tsalamlal, Non-Intrusive Haptic Interfaces: State-of-the Art Survey, HAID 2013, LNCS 7989, pp. 1-9, 2013.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for US App. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for US App. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Nuttall, A. (Feb. 1981). Some windows with very good sidelobe behavior. IEEE Transactions on Acoustics, Speech, and Signal Processing. 8 pages.
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, April 27-May 2, 2013 (10 pages).
Office Action (Ex Parte Quayle Action) dated Jan. 6, 2023 for U.S. Appl. No. 17/195,795 (pp. 1-6).
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).

(56) References Cited

OTHER PUBLICATIONS

Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2 " (Year: 2020) 9 pages.
Bjørn Kolbrek, Modal Propagat Ion in Acous T IC Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 18, 2024 for U.S. Appl. No. 18/496,002 (pp. 1-5).
Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium ON, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&Cp vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&Cp vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for US App. No. 15/960, 113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).

(56) References Cited

OTHER PUBLICATIONS

Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for US App. No. 15/960, 113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al., "2D array design based on Fermat spiral for ultrasound imaging", Ultrasonics, (Feb. 1, 2010), vol. 50, No. 2, ISSN 0041-624X, pp. 280-289, XP055210119.
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Prabhu, K. M. (2013). Window Functions and Their Applications in Signal Processing . CRC Press., pp. 87-127.
Rakkolainen et al., A Survey of Mid-Air Ultrasound Haptics and Its Applications (IEEE Transactions on Haptics), vol. 14, No. 1, 2021, 18 pages.
EPO Examination Report 17 748 4656.4 (Jan. 12, 2021) (16 pages).
EPO Examination Search Report 17 702 910.5 (Jun. 23, 2021) 10 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.

(56) References Cited

OTHER PUBLICATIONS

Hilleges et al. Interactions in the air: adding further depth to interactive tabletops, UIST '09: Proceedings of the 22nd annual ACM symposium on User interface software and technologyOct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al., "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004 10 (5):574-86.
Hyunjae Gil, Whiskers: Exploring the Use of Ultrasonic Haptic Cues on the Face, CHI 2018, Apr. 21-26, 2018, Montréal, QC, Canada, 13 pages.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces By Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detection of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.

(56) References Cited

OTHER PUBLICATIONS

Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-Jun. 15, 04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 7, 2023 for U.S. Appl. No. 16/144,474 (pp. 1-16).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).

References Cited

OTHER PUBLICATIONS

Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pags 1-6).
Office Action dated Apr. 28, 2020 for U.S. Appl. No. 15/396,851 (pp. 1-12).
"Flexible piezoelectric transducer for ultrasonic inspection of non-planar components." Ultrasonics 48.5 (2008): 367-375.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016) 11 pages.
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018) 10 pages.
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (20141119), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Cappellari et al., "Identifying Electromyography Sensor Placement using Dense Neural Networks." In Data, pp. 130-141. 2018. (Year: 2018).
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).

(56) References Cited

OTHER PUBLICATIONS

E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).
Andre J. Duerinckx, Matched gaussian apodization of pulsed acoustic phased arrays, Ultrasonic Imaging, vol. 2, Issue 4, Oct. 1980, pp. 338-369.
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/052122 (Oct. 18, 2023) 13 pages.
ISR and WO for PCT/GB2023/052612 (Mar. 7, 2024) 18 pages.
Ochiai, Cross-Field Aerial Haptics: Rendering Haptic Feedback in Air with Light and Acoustic Fields, CHI (Year: 2016) 10 pages.
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Schiefler, Generation and Analysis of Ultrasound Images Using Plane Wave and Sparse Arrays Techniques, Sensors (Year: 2018) 23 pages.

* cited by examiner

ACOUSTIC TRANSDUCER MOUNTS

RELATED APPLICATIONS

This application claims the benefit of the following three U.S. Provisional Patent Applications, each of which is incorporated by reference in its entirety:

1. Ser. No. 63/379,140, filed Oct. 11, 2022.
2. Ser. No. 63/380,749, filed Oct. 24, 2022.
3. Ser. No. 63/381,005, filed Oct. 26, 2022.

This application is also related to Ser. No. 17/804,998, filed on Jun. 1, 2022, which is incorporated by reference in its entirety.

This application is also related to Ser. No. 63/167,855, filed on Jun. 2, 2021, which is incorporated by reference in its entirety.

FIELD OF THE DISCLOSURE

This application is directed to various forms and functions of acoustic transducer mounts for transducers used in a ultrasonic transducer system that produces mid-air haptic effects.

BACKGROUND

A mid-air haptic feedback system creates tactile sensations in the air. One way to create mid-air haptic feedback is using ultrasound. A phased array of ultrasonic transducers is used to exert an acoustic radiation force on a target. This continuous distribution of sound energy, which will be referred to herein as an "acoustic field", is useful for a range of applications, including haptic feedback.

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points.

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximize the acoustic radiation force exerted.

By defining one or more control points in space, the acoustic field can be controlled. Each point can be assigned a value equating to a desired amplitude at the control point. A physical set of transducers can then be controlled to create an acoustic field exhibiting the desired amplitude at the control points.

More specifically, this disclosure is designed to support a resonant acoustic transducer whose housing is undergoing significant deformation. As the housing undergoes significant deformation, it is difficult to support such a transducer without adversely affecting its acoustic performance. An acoustic transducer has a resonance which is defined by its mass, stiffness and damping. This disclosure mounts the transducer in a manner that applies minimal mechanical constraint, which enables the resonator to oscillate with maximum amplitude. By enabling the resonator to oscillate at maximum amplitude, this ensures that the generated pressure is maximized. A further benefit to minimizing the mechanical constraint applied to the transducer, is that any extra stiffness and damping applied to the transducer are minimized, and that the frequency response of the transducer is consistent across a large sample size. This is of importance in applications that require a consistent frequency response such as use in an ultrasonic array, where multiple transducers are excited by a fixed frequency and used to generate locally high regions of pressure.

By decoupling the vibrations of the transducer from the rigid support, this provides a means of protecting the transducer from handling stresses. The rigid support may be designed to encase the transducer such that handling stresses applied to the resonant structure are minimized. The rigid support has been designed to include electrical contacts on its underside, and these contacts allow the transducer to be surface mounted onto a circuit board. Surface mounting processes such as reflow soldering or bonding with conductive adhesive allow transducers assembled into the flexible transducer mounts to be attached to a common circuit board and arrays of transducers produced in automated processes.

This disclosure is compatible with high volume manufacturing, and it can be produced as a panel of flexible circuits. The panel may be designed to interface with tooling that enables the transducers to be picked and placed onto the panel at appropriate locations, and includes cutout regions that enable flexible connections to be bonded to the transducers with pick and place tools. The design enables the transducer to be assembled into the mount using commercially available pick and place and dispensing tools.

To the authors' knowledge there are no existing examples of stiffened flexible circuits being used to support airborne ultrasonic transducers in a surface mountable package. Typical approaches are to use a combination of soldered electrical wires and compliant adhesives. While these approaches are functionally effective, they introduce multiple processing steps and are challenging to implement in a high volume manufacturing environment, likely requiring specialist automated tooling.

There are examples of flexible circuits being used to excite transducers such a product offered by PI ceramic. Smart Interface: Piezo Components with Flexible Printed Circuit Boards, www.physikinstrumente.co.uk/en/products/piezo-ceramic-components-transducers-for-oems/smart-interface/(accessed Sep. 11, 2023). However, this differs from the presented design as it does not include a rigid supporting structure, is not compatible with surface mount processes, does not use small flexible arms, and does not implement a nodal mounting approach. The product offered by PI ceramic is tailored towards running experiments in a lab, whereas the invention presented in this document is designed as a product that can be mass produced, has optimized performance and has been designed to survive operational stresses in a consumer electronics environment.

Flexible electronics have been used to form ultrasonic arrays. Bowen, C. R., et al. "Flexible piezoelectric transducer for ultrasonic inspection of non-planar components." *Ultrasonics* 48.5 (2008): 367-375. However, this approach loses the modularity that the disclosure provides. The presented design enables individual transducers to be provided to a third party and assembled into an ultrasonic array of any configuration, or used as an individual component in applications such as range finding. The presented invention is intended to enable ultrasonic transducers to be assembled onto a printed circuit board using standard pick and place processes and surface mounting approaches that are commonly implemented in the consumer electronics industry.

The design presented by Chilies et al. in US 20220393095 A1 (Chilies et al.), achieves a functionally similar design with respect to mechanically isolating a transducer with a surface mountable package. However, the design uses wire bonds rather than a flexible circuit to achieve the mechanical isolation and electrical contact which have a much higher mechanical impedance, and does not implement a nodal mounting approach. Applying Chilies et al. to transducers whose outer surface undergoes significant deformation would introduce large energy losses into the supporting structure and a loss in the acoustic performance of the mounted transducer.

This disclosure further describes a transducer whose structure has been optimized to generate the maximum acoustic pressure possible with minimal device area. The approach taken is to enclose an acoustic cavity within the walls of a mechanical resonator.

The walls of the cavity are designed such that the surfaces surrounding the cavity resonate in a vibration mode that expands and compresses the air constrained inside. By designing the mechanical structure to oscillate as one unit, with both the surfaces above and below the cavity vibrating, the vibrating surface area is maximized, and pressure generation increased per unit area of the transducer. This ensures that all of the transducers' structure is used to generate acoustic pressure, and leads to more efficient use of materials when compared with more conventional transducers (such as the unimorph structures).

This disclosure increases the ratio between the area of the actively vibrating surface that moves acoustic energy into the medium, and the mounted transducer area or footprint while maintaining transduction efficiency. This leads to greater power output and thus packing density of transducers when used in an ultrasonic array. The greater efficiency of such a design enables the packing density and pressure generated by the transducer to be further optimized, and thus aids with the miniaturization and cost reduction of mid-air haptic technology.

The increase in acoustic power generation per unit area of transducer area provides the possibility of producing transducers that are critically spaced; this is a key benefit for ultrasonic arrays. Not meeting the critical spacing condition results in transducers that sample the array aperture at a pitch less than half the wavelength, which consequently results in either higher ambient sound pressure or unwanted grating lobes as a result of spatial frequency artifacts when spatial sampling provided by the transducer array arrangement does not meet the Nyquist sampling criterion.

It is common for acoustic transducers used in alarm systems or buzzers to be designed such that a resonant plate (usually a unimorph plate) deforms in a fundamental resonance where the plate vibration is maximal at its center and zero at its edges, and in-phase across its vibrating surface. This can be achieved by bonding the plate with adhesives to generate a boundary condition that pin the plates edges, or by bonding the plate to a constraining structure that achieves a clamped edge condition. Such designs are often encased in a housing that forms an acoustic cavity above the plate. The cavity is designed to have a resonance that matches the plate and may lead to high pressure sound waves being generated when the plate (often a piezoelectric resonator) is excited with an electrical input signal. This combination is an effective way to generate high pressure sound at a limited frequency range, and has been successfully implemented for buzzers and alarm systems. A further variation of this approach is to bond the plate at nodal points to achieve a free-free boundary condition, however, this is often at the expense of radiating area. All these approaches include a resonant plate and a static housing structure that is used to create a cavity, where the acoustic cavity is excited by the resonant plate.

This disclosure differs from the previously attempted solutions where a plate is designed to resonate, and it is constrained in a manner so as to achieve the desired vibration mode at an appropriate frequency. A mechanical resonator has been developed in a box like structure, where the surfaces of the mechanical structure are formed so as to contain an internal air volume. The air volume—termed the "acoustic cavity"—is contained with the box. The box is formed by two plate-like structures where at least one of the plates include holes that act as acoustic outlets. The transducer may be assembled with either one layer of piezoelectric material on one plate, or with two layers of piezoelectric material either side of the cavity. When excited with an electrical signal, the walls of the mechanical structure cause the air within the cavity to compress and expand. This disclosure maximizes the volume velocity of the transducer. The air cavity has been designed to resonate at a similar frequency to the mechanical structure, such that the sound pressure generated within the cavity is maximized and acoustic energy emitted by the transducer is increased.

SUMMARY

Acoustic transducers are electromechanical devices. When used as an acoustic emitter, the electrical connections enable the transducer to be electrically excited and acoustic energy transmitted into the target medium. In the case of transducers whose housing vibrates with significant amplitude, the mounting structure must connect to the transducer in a manner that minimizes the mechanical constraint applied to the transducer. Failure to mount the transducer in a manner that minimizes additional mechanical constraint will result in extra stiffness and damping being applied to the transducer. Extra stiffness and damping will increase the variability in transducer performance across a sample of devices, and produce a loss of performance through additional energy losses. The invention presented herein uses a combination of low mechanical impedance features in the form of flexible arms and a compliant support to mount a transducer at nodal positions which is encased within a rigid layer. The combination of these features results in the mounted transducer being afforded protection from its environment whilst generating sound pressure with minimal losses into the mounting structure. This is particularly effective when mounting transducers whose outer walls undergo significant vibrations.

In addition to achieving electrical connections to the transducer without degrading the performance, a further challenge is to remove mechanical cross-coupling between adjacent devices when they are bonded to a common substrate. Failure to remove mechanical cross-coupling results in a degradation in focusing capability of an array of transducers. The removal of mechanical cross-coupling is critical to applications such as mid-air haptics where multiple transducers must be used to create high regions of pressure through precise control of the phase of the excitation signal. Decoupling the transducer from the stiffener enables the stiffener to encase the transducer and protect the supported device from handling stresses.

This disclosure has been designed with high volume manufacturing in mind, the where flexible transducer mount can be panelized into a grid form and the transducers assembled into the grid using commercially available pick-and-place tools. Once assembled, the mounted transducers may be attached to circuit boards using surface mount processes such as solder reflow or adhesive bonding via the electrical contacts on the underside of the flexible transducer mount.

Further described herein is a transducer whose structure has been optimized to generate the maximum acoustic pressure possible with minimal device area. The approach is to enclose an acoustic cavity within the walls of a mechanical resonator. The walls of the cavity are designed such that the surfaces surrounding the cavity resonate in a vibration mode that expands and compresses the air constrained inside. By designing the mechanical structure to oscillate as one unit, with both the surfaces above and below the cavity vibrating, the radiating surface area is maximized, and pressure generation increased. This ensures that all of the structure of the transducer is used to generate acoustic pressure, rather than designing a sub-component such as a unimorph plate that is constrained within a housing. Instead, the entire structure is designed to oscillate in a "breathing mode" that maximizes the generated sound pressure.

This disclosure maximizes the oscillating internal surface area that contributes to the acoustic pressure for a given transducer footprint area, which leads to greater packing density of transducers when used in an ultrasonic array. The greater packing density and pressure generated by the transducer aids with the miniaturization and cost reduction of mid-air haptic technology. The increase in acoustic power generation per unit area of transducer-occupied surface or footprint provides the possibility of producing transducers that are critically spaced. This is a key benefit for ultrasonic arrays where transducers placed at a pitch greater than half the wavelength results in either higher ambient sound pressure or unwanted grating lobes.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
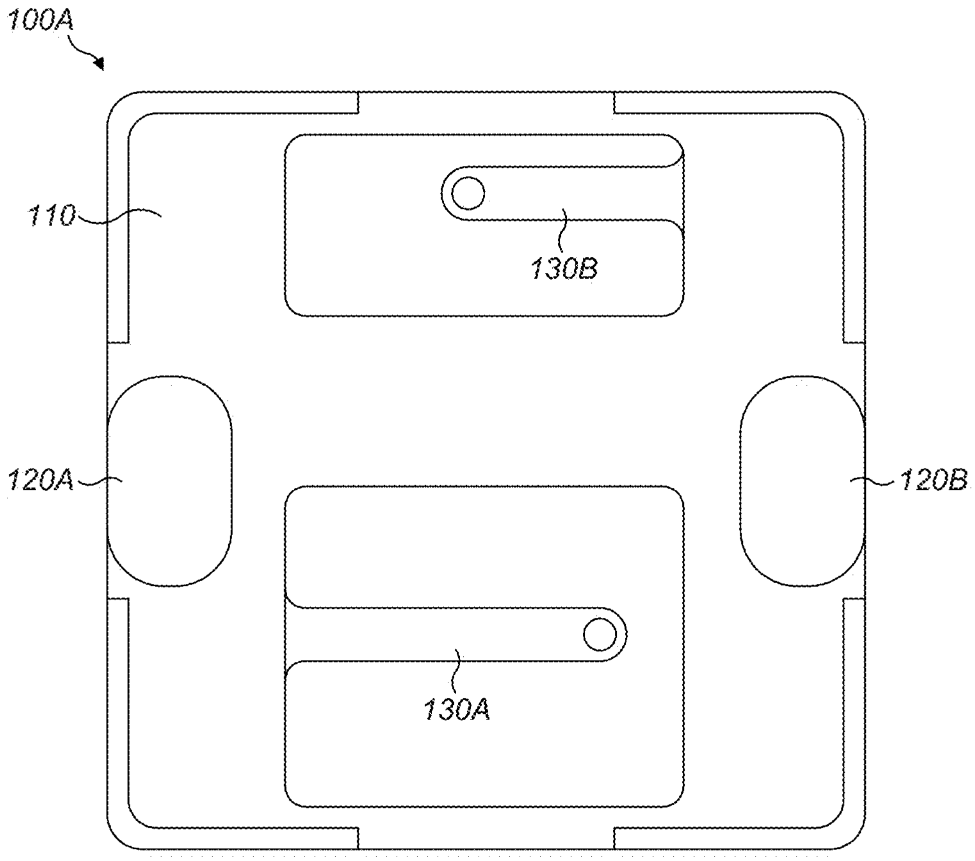
FIG. 1 shows a top view of a flexible transducer mount.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Flexible Transducer Mount

The presented disclosure, termed the flexible transducer mount, consists of a flexible circuit, rigid stiffener, and compliant material. The primary functions of the flexible transducer mount are to form an electrical connection to a transducer, mechanically support the transducer in a manner that does not impede its vibrations, remove mechanical crosstalk between adjacent devices, and provide physical protection to the transducer from its operating environment. This disclosure achieves these functions in a single component.

The flexible circuit contains flexible arms that are used to make electrical connections to the transducer. Each arm contains a conductive trace and an exposed conductive connection point at the end of the arm. The conductive traces in the arms may be encapsulated within an inert non-conductive material, or left exposed. In the presented example below they are encapsulated, which has the benefit of protecting the conductive trace from environmental factors that can damage the conductive material. For the flexible transducer mount to form an electrical connection to the transducer without impeding the transducers vibrations it is important that the arms have sufficient clearance to freely vibrate. In the example configuration presented in FIGS. 1 to 6, free vibration of the arms is achieved using cut-out regions. Alternatively a design could be created without cut-out regions providing the arms are located at positions that ensure their vibrations are not impeded by a rigid surface. The conductive traces running through each of the flexible arms connect an exposed region of conductive material at the end of the arm to an exposed conductive pad on the underside of the mount.

Figure 2:
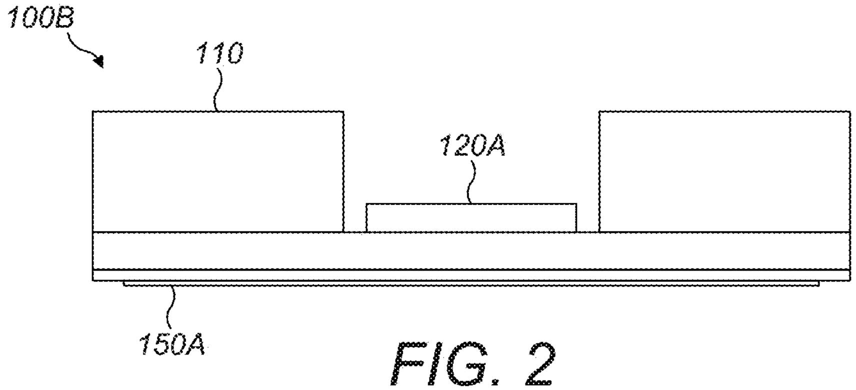
FIG. 2 shows a side view of a flexible transducer mount.
Figure 3:
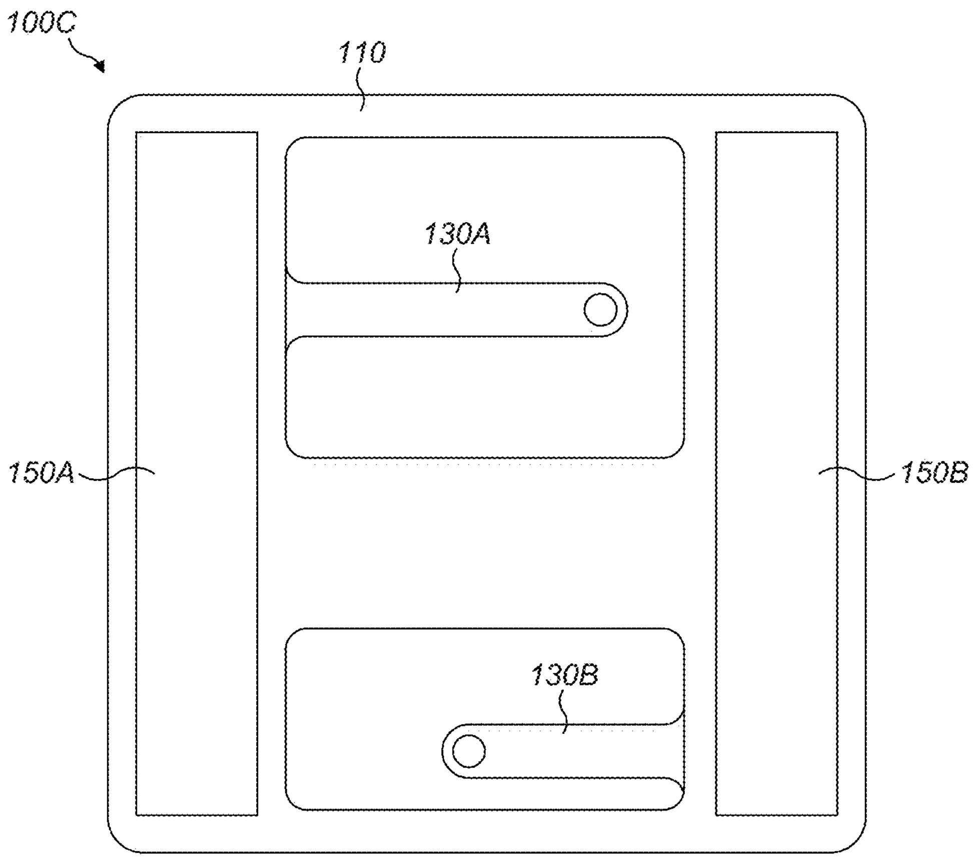
FIG. 3 shows a bottom view of a flexible transducer mount.

FIGS. 1-3 show various view of a flexible transducer mount.

Turning to FIG. 1, shown is a schematic 100A of the top of a flexible transducer mount, including a stiffener 110, flexible arms 130A 130B, and compliant material 120A 120B.

Turning to FIG. 2, shown is a schematic 100B of the side of a flexible transducer mount, including compliant material 120A, a stiffener 110, and conductive pad 150A.

Turning to FIG. 3, shown is a schematic 100C of the bottom of a flexible transducer mount, including a stiffener 110, conductive pads 150A 150B, and flexible arms 130A 130B.

FIGS. 1-3 show an exemplary configuration, but note that the number of flexible arms 130A 130B and conductive 150A 150B pad profiles may be adjusted to suit the needs of a particular application. In the presented example there are two flexible arms 130A 130B, one 130A is used to form the input voltage connection, and a second 130B used to form the ground connection. Note that different transducer constructions may require alternative arm locations and numbers of connecting arms, these choices must be selected to suit the particular transducer construction. In some cases a differential voltage may be required to generate a specific input signal for the transducer, to achieve this an additional arm and conductive pad on the base of the flexible transducer mount is required. More arms may also be added to the design to achieve greater levels of redundancy. The function served by the conductive pads on the underside, compliant traces in the arms, and exposed conductive regions at the end of each arm is to provide a means of electrically connecting the transducer to appropriate regions on a substrate, so that it can be excited by the application specific input signal.

The previous paragraph describes how the electrical connections are routed through the arms and to the mounted transducer. A second design feature of the flexible arms 130A 130B is that they are designed to be of a low mechanical impedance, such that they do not impede the vibrations of the transducer. In the presented design the arms are modelled as cantilevers.

The remaining area of the flexible circuit is backed with a stiffener 110. In printed circuits this is often made from FR4, however, any rigid material could be used. The function of the stiffener 110 is to provide a rigid base to support the mounted transducer. If designed to encase the transducer, the stiffener 110 may also provide protection to the transducer from handling stresses.

Table 1 lists some example configurations of flexible arms for transducers of different sizes and resonant frequencies.

TABLE 1

| Flexible transducer mount configuration | A | B | C |
|---|---|---|---|
| Transducer width (mm) | 10 | 7 | 3.5 |
| Transducer resonant frequency (kHz) | 40 | 60 | 100 |
| Arm length (mm) | 3.6 | 2.3 | 1.5 |
| Trace thickness (mm) | 0.05 | 0.025 | 0.03 |
| Trace width (mm) | 0.3 | 0.2 | 0.1 |
| Arm stiffness (N/m) | 34.8 | 27.8 | 34.7 |
| Mechanical Impedance Arm (μN · s/m) | 138 | 74 | 55 |

Table 1 shows geometrical properties, stiffness, and mechanical impedance of flexible arms in three different configurations where the geometry of the mount has been adjusted to support transducers of varied resonant frequency and physical dimensions. The stiffness and impedance were calculated assuming a Young's modulus (E) of 130 GPa for the conductive trace. (Young's modulus is a mechanical property that measures the tensile or compressive stiffness of a solid material when the force is applied lengthwise.)

Equation 1 relates the force F applied at the end of the arm to its deflection x. E is the Young's Modulus, t is the trace thickness, w is the trace width, and L is the arm length.

$$F = \frac{E.w.t^3}{3.L^3}.x \qquad \text{Eq. 1}$$

The stiffness of the arm $K_{arm}$ is calculated using Equation 2

$$K_{arm} = \frac{E.w.t^3}{3.L^3} \qquad \text{Eq. 2}$$

This can then be converted into a mechanical impedance using Equation 3 where $Z_{arm}$ is the mechanical impedance and co the angular frequency.

$$Z_{arm} = -j\frac{K_{arm}}{\omega} \qquad \text{Eq. 3}$$

The presented design incorporates arms with a high aspect ratio, where L>3·w and L>3·t. The high aspect ratio results in a low mechanical impedance of the arms.

Figure 4:
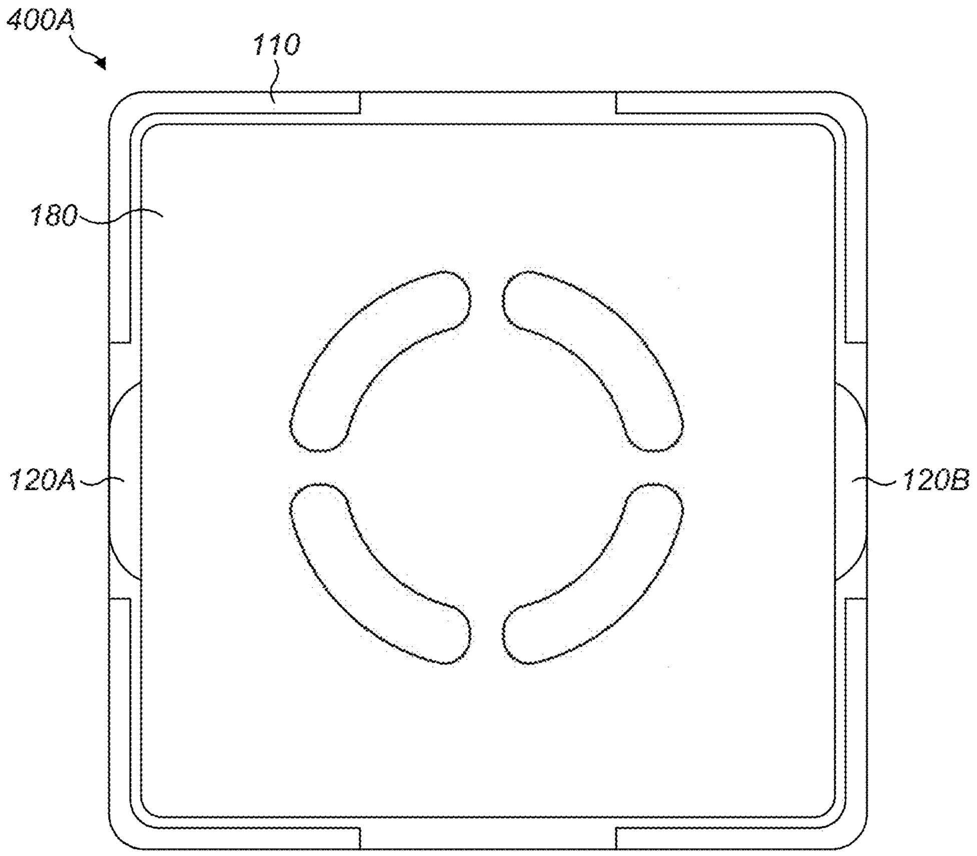
FIG. 4 shows a top view of a mounted transducer assembly.
Figure 5:
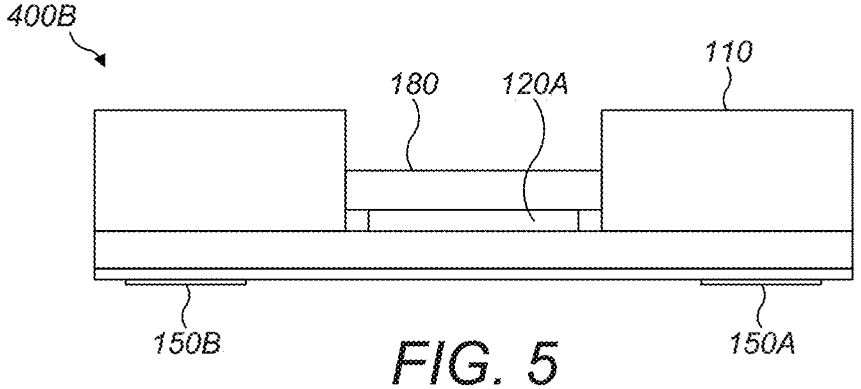
FIG. 5 shows a side view of a mounted transducer assembly.
Figure 6:
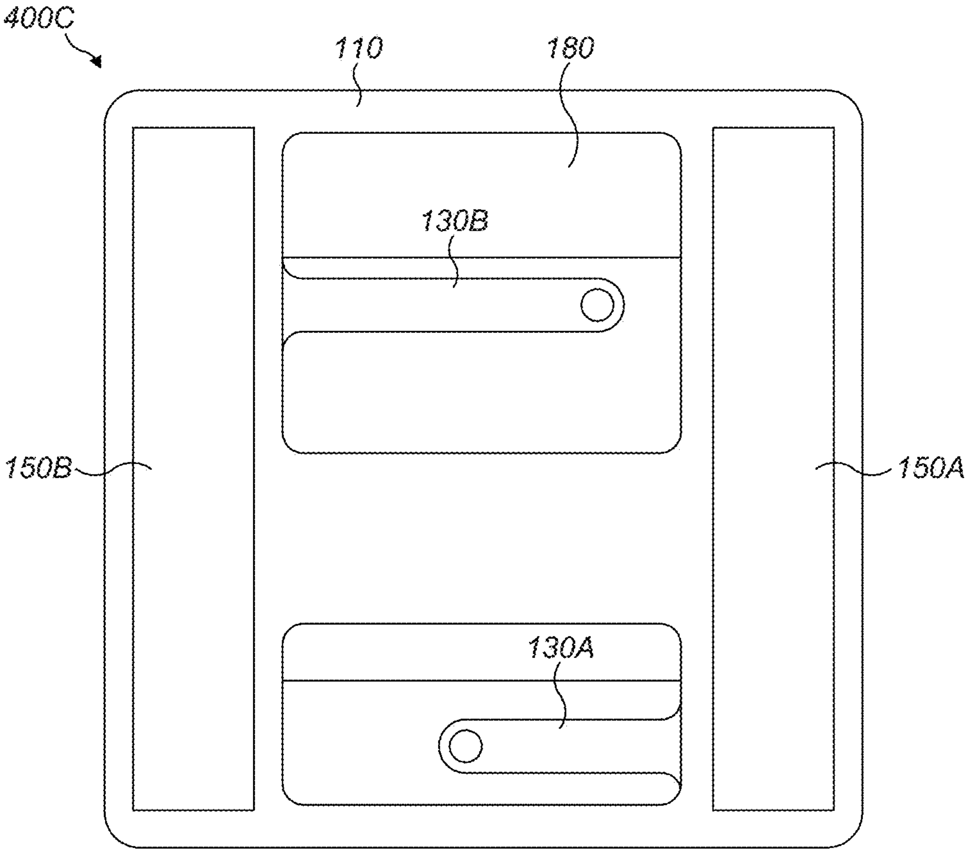
FIG. 6 shows a bottom view of a mounted transducer assembly.

FIGS. 4-6 show various view of a mounted transducer assembly.

Turning to FIG. 4, shown is a schematic 400A of the top of a mounted transducer assembly, including a transducer 180, a stiffener 110, and compliant material 120A 120B.

Turning to FIG. 5, shown is a schematic 400B of the side of a mounted transducer assembly, including a stiffener 110, compliant materials 120A, conductive pads 150A 150B, and transducer 180.

Turning to FIG. 6, shown is a schematic 400C of the bottom of a mounted transducer assembly, including a stiffener 110, flexible arms 130A 130B, conductive pads 150A 150B, and transducer 180.

The side walls of the stiffener 110 protect the transducer 180 from handling stresses. Alternative configurations may be used to provide increased levels of protection to the transducer 180 such as including a protective grille over the top of the transducer. Providing the stiffener 110 does not make contact with the transducer 180 and the acoustic outlets are not blocked, any geometry can be used without adversely affecting the transducers performance.

In addition to the flexible arms 130A 130B, the flexible transducer mount also makes contact to the transducer 180 with regions of compliant material 120A 120B. The compliant material 120A 120B is adhered to the stiffener 110 and the transducer 180.

FIG. 6 shows flexible arms 130A 130B adhered to the transducer. The signal flexible arm 130B, bonded to the piezoelectric material, is located in the top half of FIG. 6. This end of the flexible arm 130B has been positioned as close as possible to the nodal ring given the constraints of the available area of the piezoelectric material and allowable proximity of the flexible arm 130B to the stiffener 110. The ground connection flexible arm 1310A, located in the bottom half of FIG. 6 is positioned on the nodal ring.

In the example configuration presented herein, there are two regions of compliant material 120A 120B. The effective stiffness and damping of the regions of compliant material 120A 120B may be modelled as a complex impedance using Equations 4, 5, 6, and 7.

Equation 4 provides the deflection of an elastic material under axial loading, where x is the deflection of the compliant material, F is the force acting on the compliant material, A is the total cross sectional, E is the real part of the Youngs modulus, and L is the height.

$$x = \frac{F.L}{A.E} \quad \text{Eq. 4}$$

Equation 4 may be rearranged to calculate the stiffness of the compliant material $K_{comp}$ into Equation 5.

$$K_{comp} = \frac{F}{x} = \frac{A.E}{L} \quad \text{Eq. 5}$$

The damping exerted by the compliant material on the mounted transducer may be calculated by modelling the transducer as a single degree of freedom mass spring damper system. Equation 6 calculates the damping of the complaint material $C_{comp}$, where $m_{tran}$ is the transducers mass, and $\zeta$ is the damping ratio.

$$C_{comp}–2\cdot\sqrt{K_{comp}\cdot m_{tran}}\cdot\zeta \quad \text{Eq. 6}$$

The complex impedance of the compliant material is calculated using Equation 7, where $Z_{comp}$ is the complex impedance, and co is the angular frequency.

$$Z_{comp} = -j\frac{K_{comp}}{\omega} + C_{comp} \quad \text{Eq. 7}$$

Table 2 lists potential configurations of the compliant material in flexible transducer mounts designed to mount transducers of different sizes and resonant frequencies.

TABLE 2

| Flexible transducer mount configuration | A | B | C |
|---|---|---|---|
| Transducer width (mm) | 10 | 7 | 3.5 |
| Transducer resonant frequency (kHz) | 40 | 60 | 100 |
| Total area of compliant material Area ($mm^2$) | 12 | 6 | 4 |
| Compliant material thickness (mm) | 0.8 | 0.2 | 0.1 |
| Compliant material stiffness (N/m) | 21,000 | 42,000 | 56,000 |
| Compliant material Damping (N · s/m) | 0.502 | 0.497 | 0.287 |
| Mechanical Impedance compliant material (N · s/m) | 0.502- 0.084 j | 0.497- 0.111 j | 0.287- 0.890 j |

Table 2 shows geometrical properties, stiffness, damping and mechanical impedance of the compliant material in three different example configurations. The stiffness, damping, and impedance are calculated assuming a Young's modulus (E) of 1.4 MPa, and a damping ratio ($\zeta$) of 0.1.

Comparing the values of mechanical impedance in Tables 1 and 2 shows that the mechanical impedance of the compliant material is the dominant factor in the total impedance of the flexible transducer mount. While the exemplary configuration shown in FIGS. 1-6 have two regions of compliant material 120A 120B, the geometry of the compliant material and number of deposited regions may be any combination where the mechanical impedance does not result in excessive energy losses.

In addition to the careful design of the material properties and geometry to minimize the mechanical impedance, the exemplary configuration shown in FIGS. 1-6 have been designed such that the parts attached to the transducer are bonded as close as is practically possible to the nodal ring of the transducer. Such design constraints are motivated by the transducer's construction.

Figure 7:
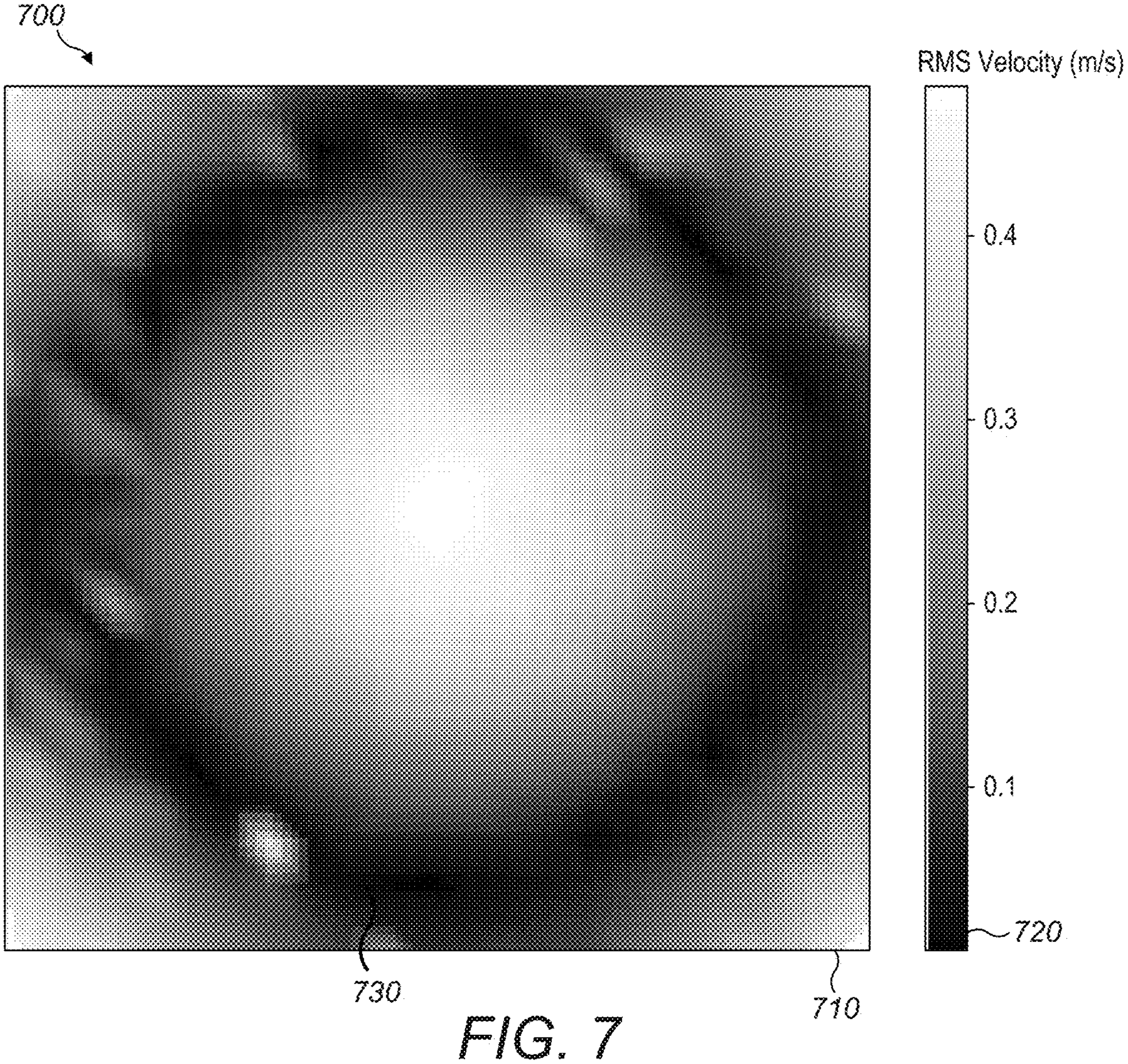
FIG. 7 shows a laser doppler vibrometer (LDV) measurement across the back surface of the transducer in FIG. 6.

Turning to FIG. 7, shown is a laser doppler vibrometer measurement 700 showing the root mean squared velocity (in m/s) 720 across the back surface of the square transducer 710 shown in FIG. 6. At points along or close to the nodal ring (black circle) 730, the amplitude of vibrations of the transducer is minimal.

FIG. 7 shows LDV measurements of the magnitude of velocity across the surface of the transducer. The nodal ring 730 is shown as a black ring, which sits within the square transducer profile. In this example, where the compliant material 120A 120B has been positioned to sit along the nodal ring 730, it adheres to the central part of two opposite sides of the transducer 180 such that it is bonded to a region of minimal vibration amplitude. If an alternative transducer was being mounted whose nodal region was at alternative positions, the flexible transducer mount geometry should be adjusted so that the compliant material adheres to the transducer at the new nodal positions. For the transducer to be electrically connected to the flexible transducer mount, the flexible arms which contain exposed conductive regions at their ends must be adhered to the transducer.

As stated above, FIG. 6 shows the bottom view 400C of a transducer 180 mounted using the flexible transducer mount. The flexible arms 130A 130B, are bonded to the bottom surface of the transducer 180. The ends of the flexible arms 130A 130B have been designed to adhere to the transducer at regions which are as close to the transducers nodal ring as possible. Here it was not possible to adhere both flexible arms 130A 130B to the transducer 180 precisely along the nodal ring. This is because there exist constraints on the positions of the flexible arms 130A 130B due to the specific transducer 180 construction; the signal flexible arm 130B must be adhered to a piezoelectric region, and the ground flexible arm 130A must be connected to the metallic layers for the transducer 180 to be electrically excited. There are also additional manufacturing limitations that limit the minimum distance the flexible arms 130A 130B can be placed to the stiffener 110 without preventing access of the tooling used to deposit the conductive adhesive required to adhere the flexible arms 130A 130B to the transducer 180.

FIG. 7 demonstrates that the velocity distribution 720 along the transducers surface 710 is a continuously varying quantity, and that the velocity 720 decreases as it approaches the nodal ring 730. Therefore adhering to the transducer at locations close to the nodal ring 730 is still beneficial when compared with adhering to the transducer at the central region or corners where the magnitude of velocity is maximum. The high aspect ratio and low mechanical impedance of the flexible arms limits the potential negative impact of their off nodal bonding locations, as further shown in FIG. 1.

Figure 8:
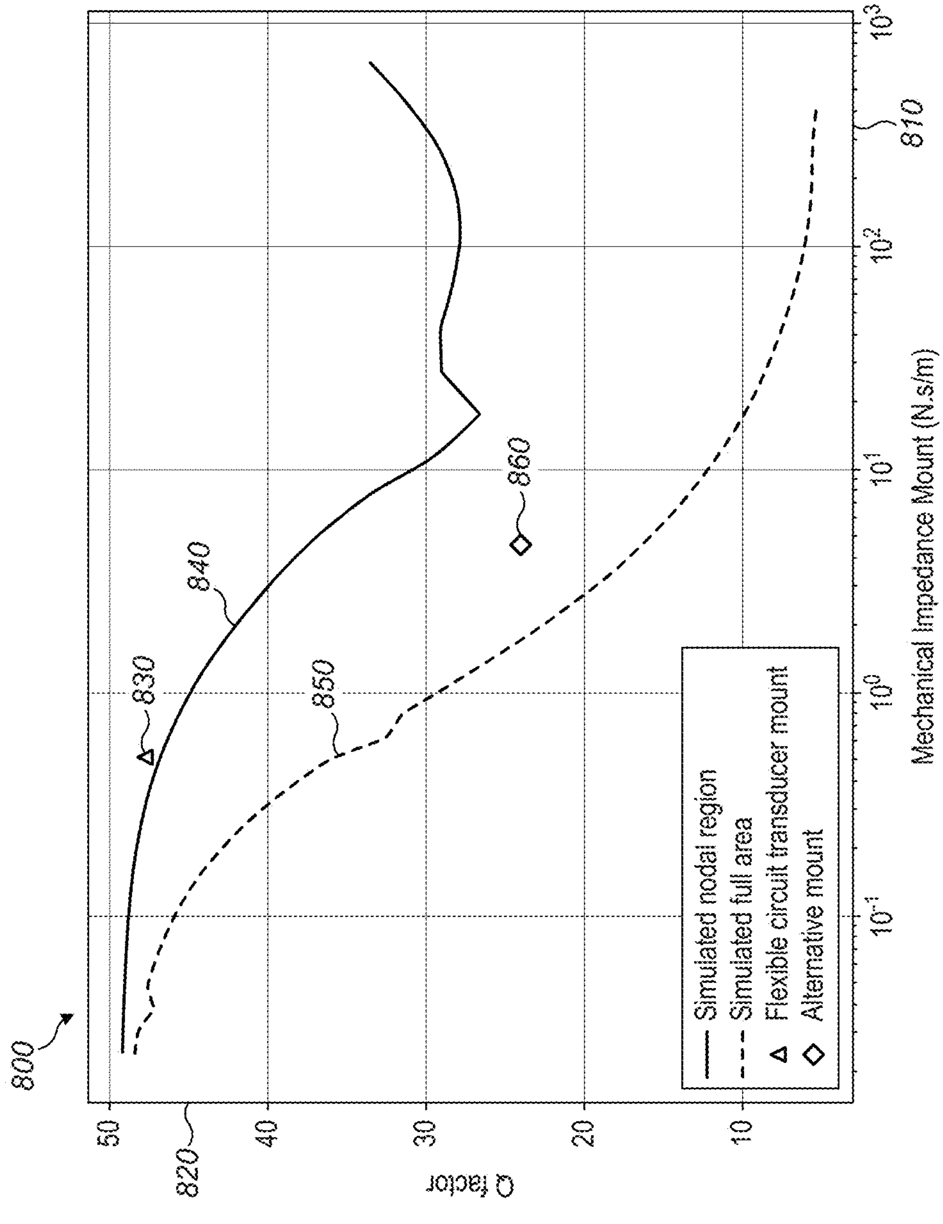
FIG. 8 shows plots of the Q factor of transducers.

Turing to FIG. 8, shown is a plot 800 of the Q factor (the ratio of the center frequency of the transducer to the bandwidth) of the transducer system shown in FIGS. 1-6 on the y-axis 820 against the magnitude of mechanical impedance of the transducer mounting on the x-axis 810. The quality factor Q is a dimensionless measure of transducer performance that is inversely proportional to energy losses. FIG. 8 has been generated with the example transducer construction shown in FIGS. 1-6. The version of the flexible transducer mount developed for this specific transducer construction is plotted in FIG. 8 (Version B, tables 1 and 2). The data demonstrates that a transducer mounted onto the flexible transducer mount achieves a high Q factor.

In the simulations underlying this FIG. 8, the transducer system is represented by a mass spring damper, where the transducer mass is 0.23 g, the stiffness is varied, and the damping ratio (0 is 0.1. The "Simulated full area" plot 850 shows the response when the impedance is distributed evenly over the underside of the transducer. The "Simulated nodal region" plot 840 shows the response when the mass spring damper is distributed over a nodal region. The "Flexible transducer mount" 830 is an experimental measurement of a transducer attached to a flexible transducer mount (Version B, of tables 1 and 2). The "Alternative mount" 860 is an experimental measurement of transducer Version B, of Tables 1 and 2, mounted with an alternative mounting approach.

FIG. 8 plots transducer Q factor vs magnitude of mount impedance for simulated and experimentally tested transducer constructions. These plots demonstrate that a transducer is able to tolerate much higher impedances when it is attached at nodal locations. FIG. 8 shows that there is a 10% reduction in Q factor for a nodal mounted transducer at a mount impedance of 1 N·s/m 840. In contrast, when the impedance is evenly distributed across the entire underside of the transducer a 0.1 N·s/m 850, impedance can reduce the Q factor by 10%. This demonstrates the importance of appropriate bonding locations. Nevertheless, it can be seen that even with nodal mounting, the performance of the transducer can be significantly degraded if the impedance of the attached components exceeds 1 N·s/m.

Figure 9:
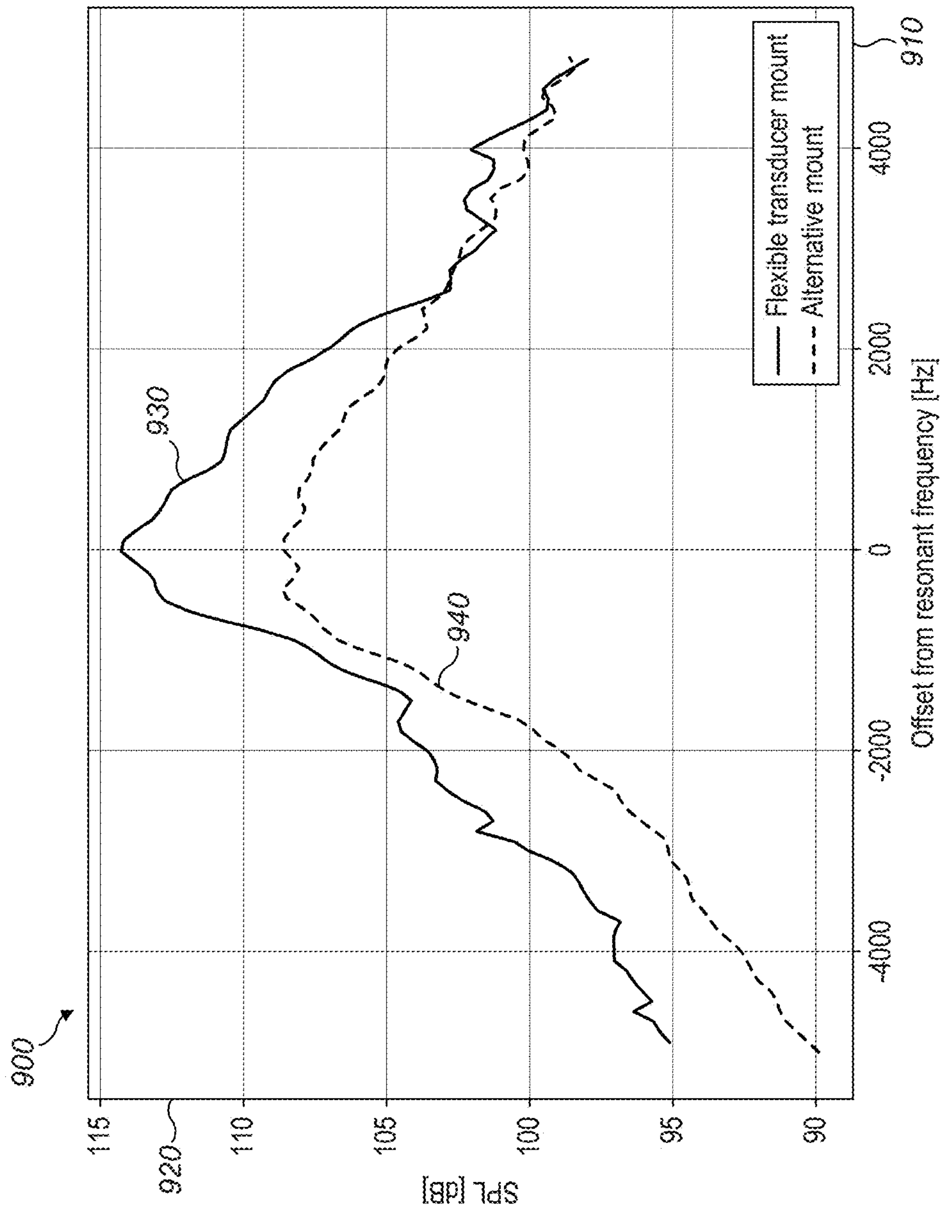
FIG. 9 shows plots of the sound pressure level (SPL) of transducers.

Turning to FIG. 9, shown is a plot 900 of SPL in dB on the y-axis 920 against an offset from resonant frequency in Hz on the x-axis 910 at a common distance and drive voltage. The flexible transducer output plot 930 demonstrates the increase in acoustic pressure generation when the flexible transducer mount (Version B, tables 1 and 2) is used to mount a transducer. The alternative higher impedance with off-nodal mounting plot 940 shows this approach produces less SPL at almost all offsets.

The flexible transducer mount may be described in general terms as a flexible structure backed and/or encased within a stiffener, which supports a transducer on regions of a compliant material (Youngs' Modulus<1 GPa). The material properties and geometry of the compliant material have been optimized to minimize its mechanical impedance. The design uses flexible arms to achieve electrical connection to the mounted transducer that have a high aspect ratio L>3·w and L>3·t, and low mechanical impedance (<0.01 N·s/m). The optimal configuration of the flexible transducer mount attaches the transducer to the compliant material and flexible arms along its nodal regions. Nonetheless, simply attaching along the nodal region is not sufficient to produce a high efficiency transducer. The transducer system only achieves the desired functionality when the low impedance connections, ridged support/case, and nodal mounting are combined together. To maximize transducer efficiency, the total mechanical impedance of the mount seen by the transducer must be less than a critical value, and this critical value depends upon the impedance of the specific transducer construction. This value, however, will always be less than the transducer's own impedance.

FIG. 9 demonstrates the improvements in transducer performance made possible by using the flexible transducer mount. The combination of low mechanical impedance of the components adhered to the transducer, and adhering locations that are as close as possible to the nodal ring, ensures that the energy losses from the transducer to the mount are minimized and pressure generated maximized.

In addition to maximizing the efficiency of transduction, this transducer system ensures that there is no mechanical cross-coupling between neighboring devices when multiple devices are bonded to a common substrate. This is an essential feature of the design for applications such as mid-air haptics, where multiple transducers must be bonded to a common substrate and excited with precisely controlled phases and amplitudes to generate high pressure regions of focused ultrasound.

Figure 10:
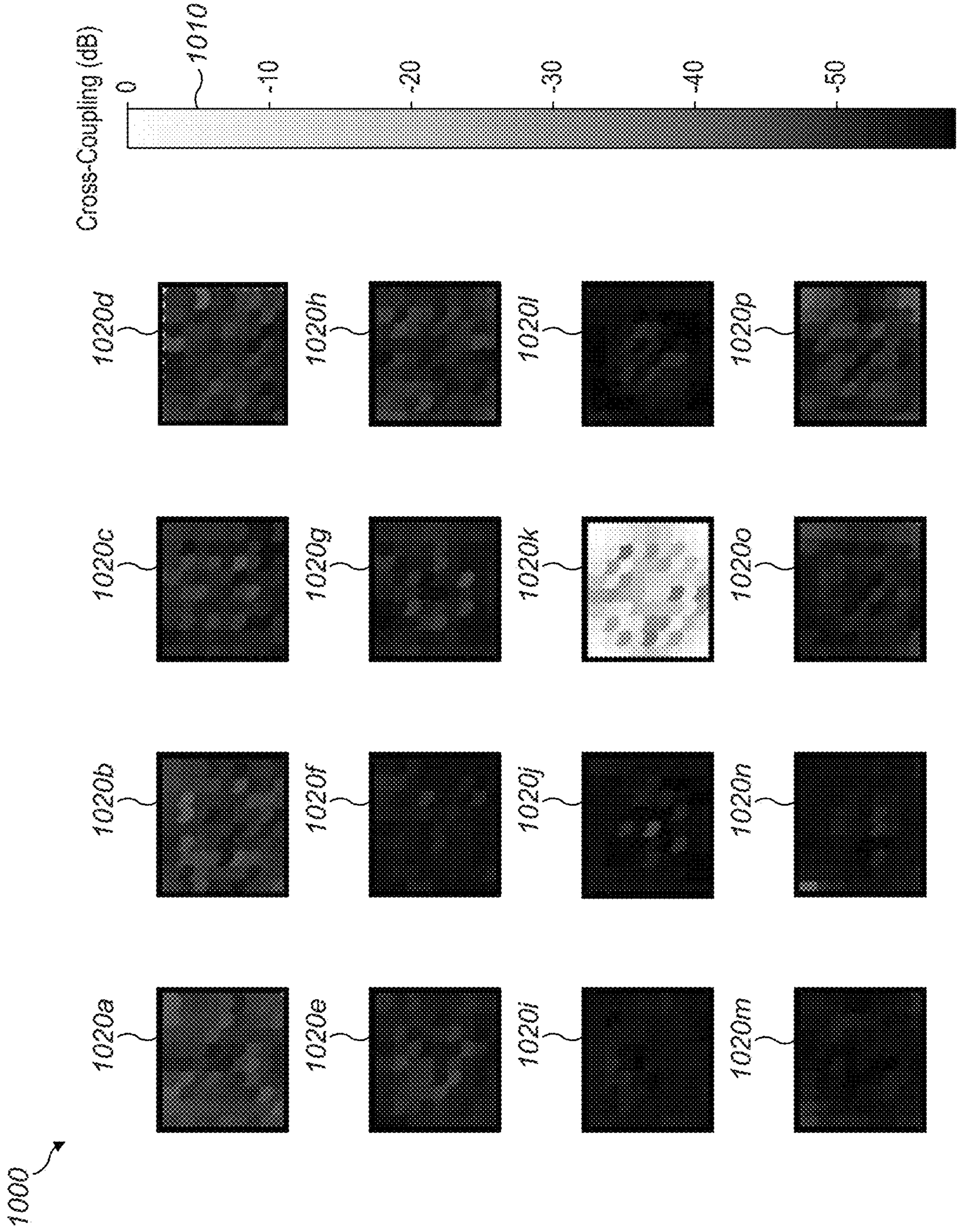
FIG. 10 shows LDV measurements of transducers mounted onto a printed circuit board (PCB).

Turning to FIG. 10, shown are experimental LDV measurements 1000 of 16 transducers 1020*a* 1020*b* 1020*c* 1020*d* 1020*e* 1020*f* 1020*g* 1020*h* 1020*i* 1020*j* 1020*k* 1020*l* 1020*m* 1020*n* 1020*o* 1020*p* mounted onto a PCB using the flexible transducer mount (Version B, tables 1 and 2) with cross-coupling 1010 shown in db. The driven transducer 1020*k* (row 3, column 3) is white/light grey (0 to −10 dB). The non-driven transducers 1020*a* 1020*b* 1020*c* 1020*d* 1020*e* 1020*f* 1020*g* 1020*h* 1020*i* 1020*j* 1020*l* 1020*m* 1020*n* 1020*o* 1020*p* (remaining 15 devices) are black/dark grey (less than −40 dB). A black box has been drawn around each transducer to aid identification.

FIG. 10 demonstrates the removal of mechanical cross-coupling between transducers assembled into the flexible transducer mounts and attached to a common circuit board. It can be seen from viewing FIG. 10 that the mechanical cross talk between the driven transducer (transducer row 3 column 3, white) and the undriven transducers (remaining 15 devices, black) is less than −40 dB.

A final benefit of this transducer system is that it can be fabricated in a panelized form that is compatible with commercially available "pick and place" tools and with dispensing tools that are commonly used in high volume manufacturing.

Figure 11:
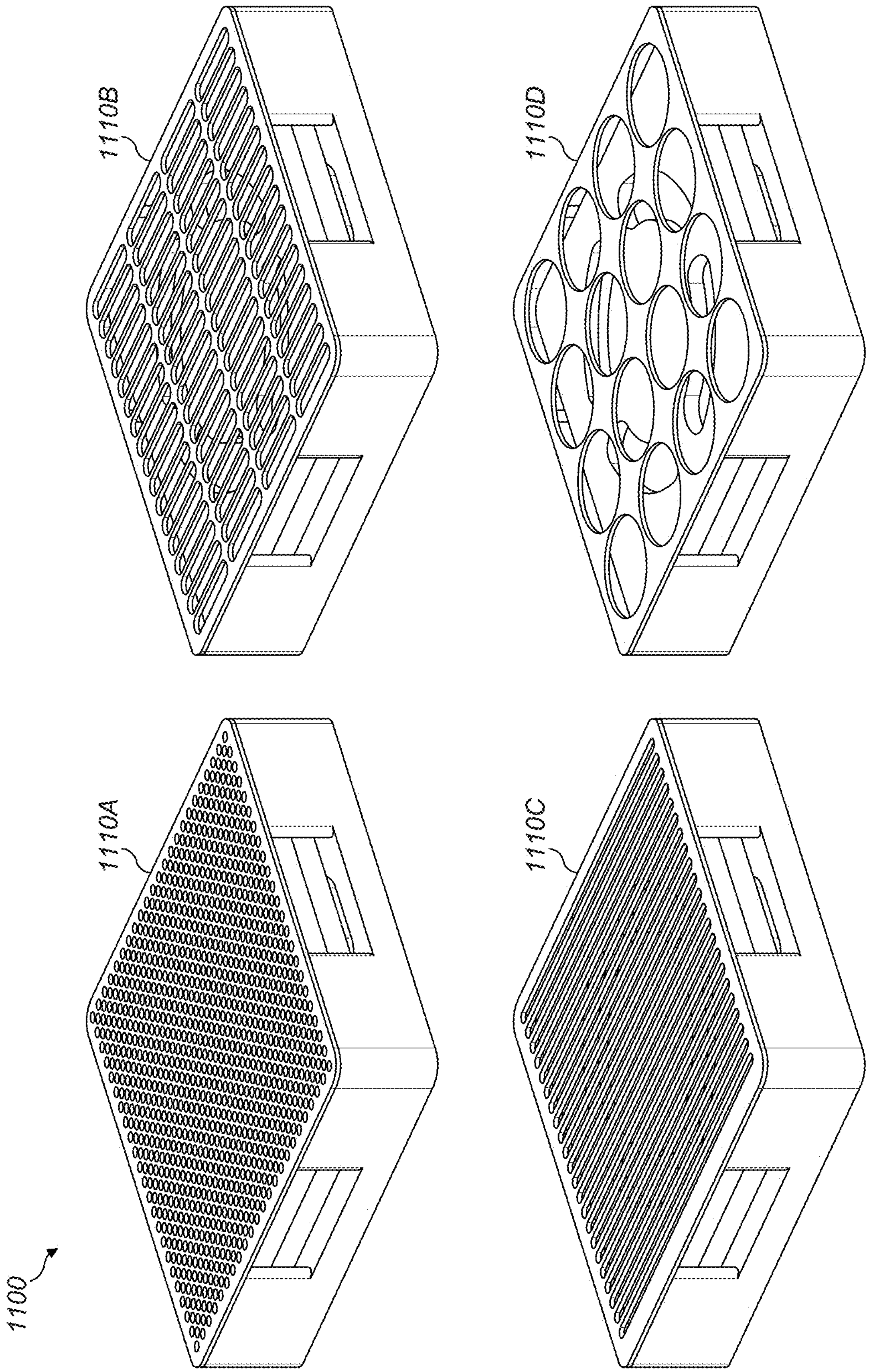
FIG. 11 shows alternative protective grille designs for transducers.

Turning to FIG. 11, shown is a schematic 1100 of diagrams showing a potential flexible transducer mount configurations where the transducer is covered with a protective grille. A different style protective grille has been used in each case, namely: small circle cutouts 1110A; four columns of bar-shaped cutouts 1110B; long bar-shaped cutouts 1110C; and large circle cutouts 1110D.

For alternative configurations, the flexible transducer mount may be designed to include a protective grille over the top of the device. This grille would prevent a user from touching the acoustic resonator mounted inside the case. FIG. 11 shows some potential configurations of the flexible transducer mount which feature a protective grille.

To increase the redundancy in electrical connections the number of connecting arms may be increased. This ensures that the device remains functional despite the loss of connection in one of the arms. Such failures could arise in a product due to operational stresses or aggressive handling of the parts.

Figure 12:
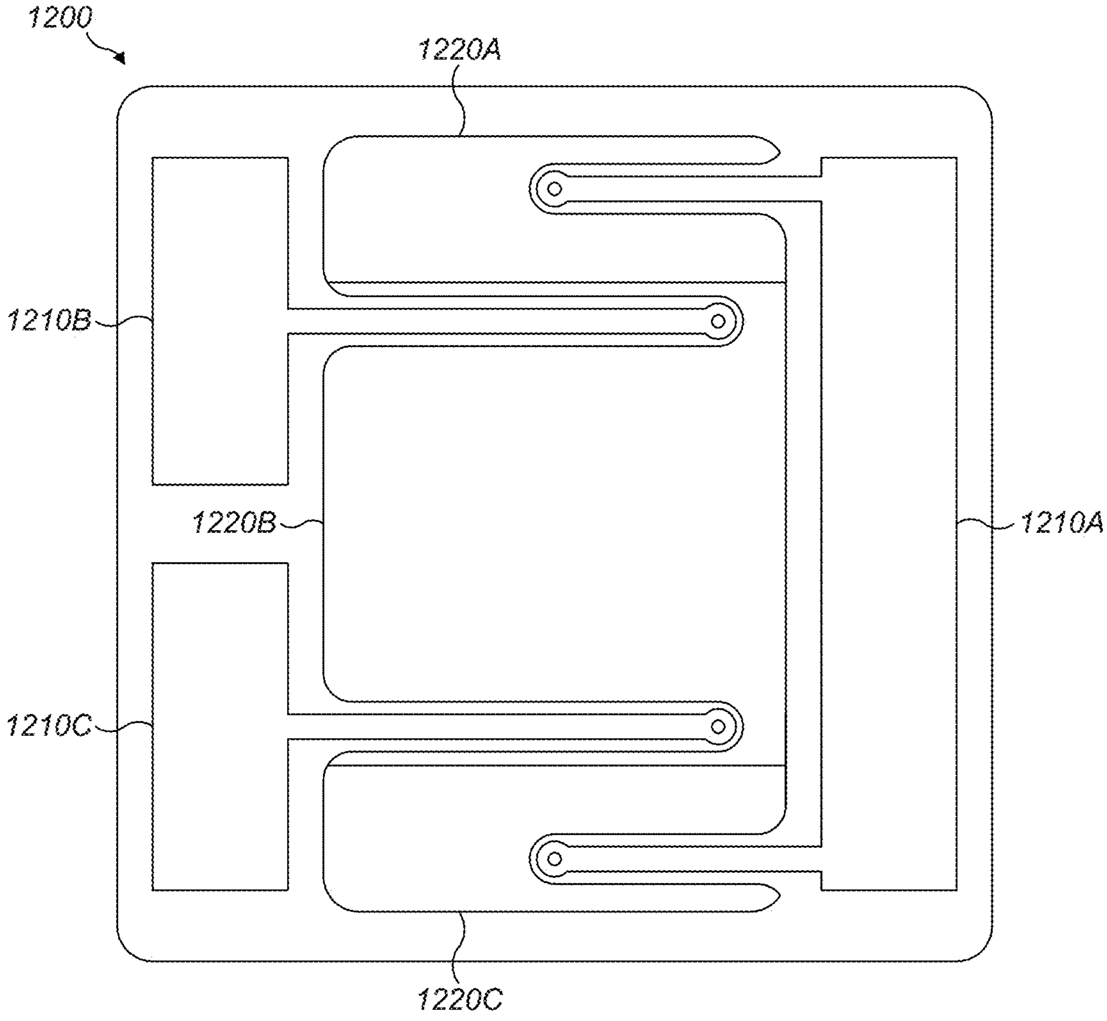
FIG. 12 shows the underside of an alternative flexible transducer mount configuration.

Turning to FIG. 12, shown is a schematic 1200 of the underside of an alternative flexible transducer mount configuration, including additional flexible arms 1220A 1220B 1220C and conductive pads 1210A 1210B 1210C to facilitate differential signal inputs and redundancy in electrical connections. FIG. 12 thus shows an example of a flexible transducer mount which features additional electrical input pads for differential inputs or extra redundancy in electrical connections.

The example design presented herein outlines one possible version of the flexible transducer mount that has been optimized for a specific piezoelectric transducer configuration. This flexible transducer mount may be adapted to support alternative transducer shapes, transducers relying on alternative transduction methods, or range of different sized devices.

Figure 13A:
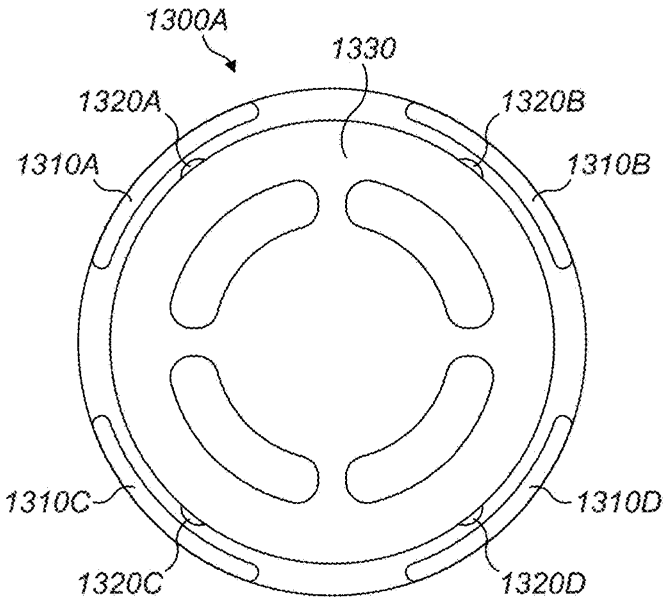
FIGS. 13A, 13B, and 13C show a circular flexible transducer.
Figure 13B:
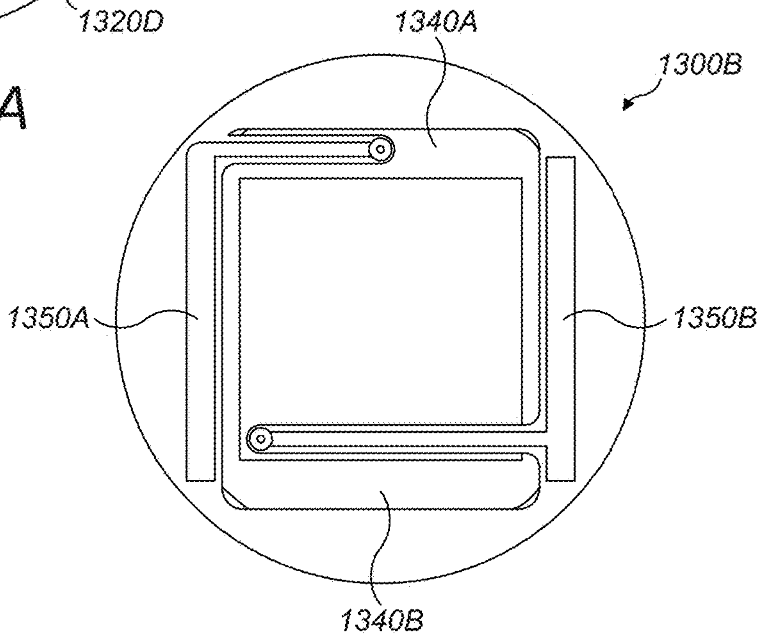
Figure 13C:
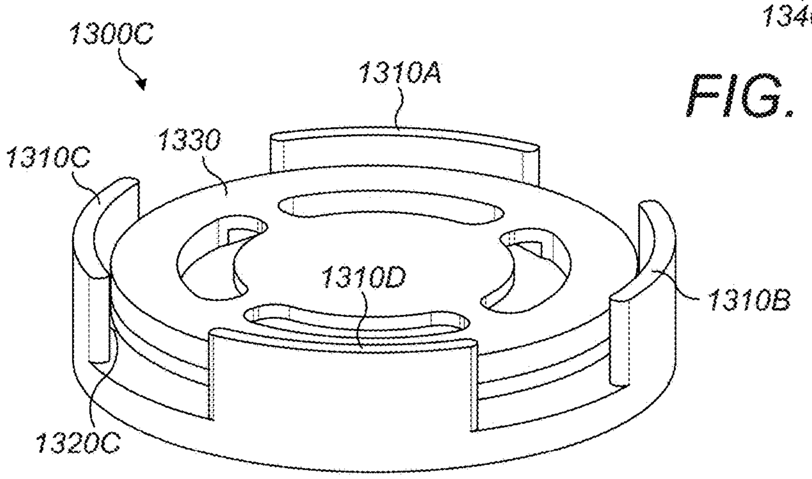

FIGS. 13A, 13B, and 13C show a circular variation of the flexible transducer mount, designed to mount circular transducers.

Turning to FIG. 13A, shown is a schematic 1300A of a circular flexible transducer top view. This view shows stiffeners 1310A 1310B 1310C 1310D, compliant material 1320A 1320B 1320C 1320D, and transducer 1330.

Turning to FIG. 13B, shown is a schematic 1300B of a circular flexible transducer bottom view. This view shows flexible arms 1340A 1340B and pads 1350A 1350B.

Turning to FIG. 13C, shown is a schematic 1300C of a circular flexible transducer isometric view. This view shows stiffeners 1310A 1310B 1310C 1310D, compliant material 1320C, and transducer 1330.

Although this disclosure describes square and circular transducers mounted with the flexible transducer mount, the design may be adapted to mount any shaped transducer by applying the same principles. The diagrams showing the mounted transducers FIGS. 1-6, 11, 13A, 13B, and 13C have been drawn such that the transducer is orientated with its outlets facing upwards. The design may be adapted such that the outlets faced in an alternative direction. For example, the outlets may be positioned on the side walls of the flexible transducer mount. The outlets drawn in the FIGS. 1-6, 11, 13A, 13B, and 13C have been drawn with an annular configuration. The flexible transducer mount may be used to mount transducers with outlets of any geometry and location.

The flexible transducer mount is not bounded by its size. Instead, the practical limits of the design are driven by the mounted transducers impedance, the transducers operating frequency, and the desired acoustic field.

The examples presented herein were developed using flexible circuit technology. The same functionality may be achieved using a flexible frame made from a conductive material, provided that the mechanical impedance meets the previously defined conditions and the conductive pathways are appropriately routed.

Potential areas of may include:

- Adaptation of a flexible circuits to be optimized for mounting a transducer whose outer surfaces oscillate with significant amplitude.
- Identifying the criticality of nodal ring mounting, and achieving this mounting with a design suitable for high volume manufacture.
- Design of low impedance connecting arms and mechanical connections to the transducer
- Creating a functionally complex design with components that can be mass produced.
- Use of a stiffener in the flexible PCB panel that can be used to encase/support the transducer.

II. Bilaminate Acoustic Transducer

A bilaminate acoustic transducer consists of an acoustic transducer comprised of two plates bonded together and located on either side of an internal acoustic cavity. This mechanical structure is designed to resonate in a "breathing mode" that maximizes the acoustic pressure generated inside the cavity. The internal cavity has an acoustic resonance that is designed to coincide with the resonance of the mechanical structure surrounding it.

FIGS. 14 and 15 show two of many potential embodiments.

Figure 14A:
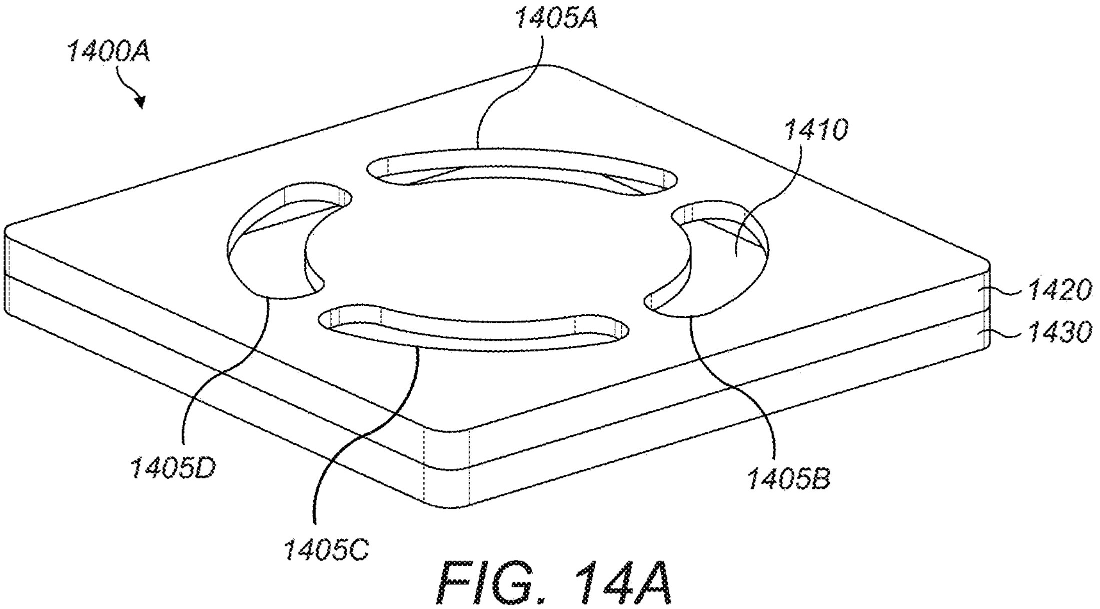
FIGS. 14A and 14B show a square bilaminate transducer consisting of two structural layers.

Turning to FIG. 14A, shown is a schematic 1400A of a square bilaminate transducer consisting of two structural layers 1420 1430 and an internal acoustic cavity 1410. The bottom layer is a plate 1430, the top layer is a plate 1420 with acoustic outlets 1405A 1405B 1405C 1405D removed from it.

Figure 14B:
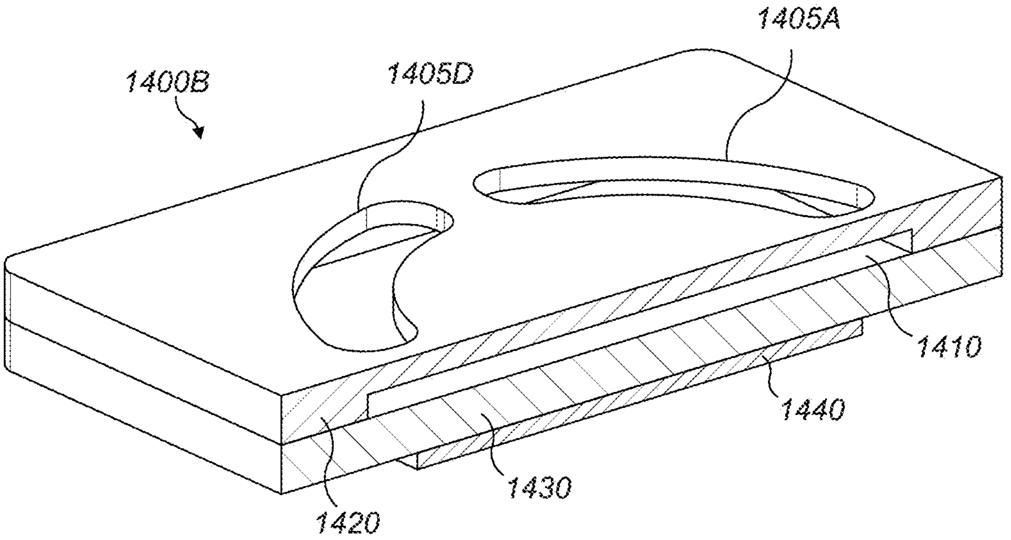

Turing to FIG. 14B, shown is a schematic 1400B of a cross-section of square bilaminate transducer consisting of two structural layers 1420 1430 and an internal acoustic cavity 1410. The bottom layer is a plate 1430, the top layer is a plate 1420 with acoustic outlets 1405A 1405D removed from it. A piezoelectric layer 1440 bonded to the bottom plate 1430.

Figure 15A:
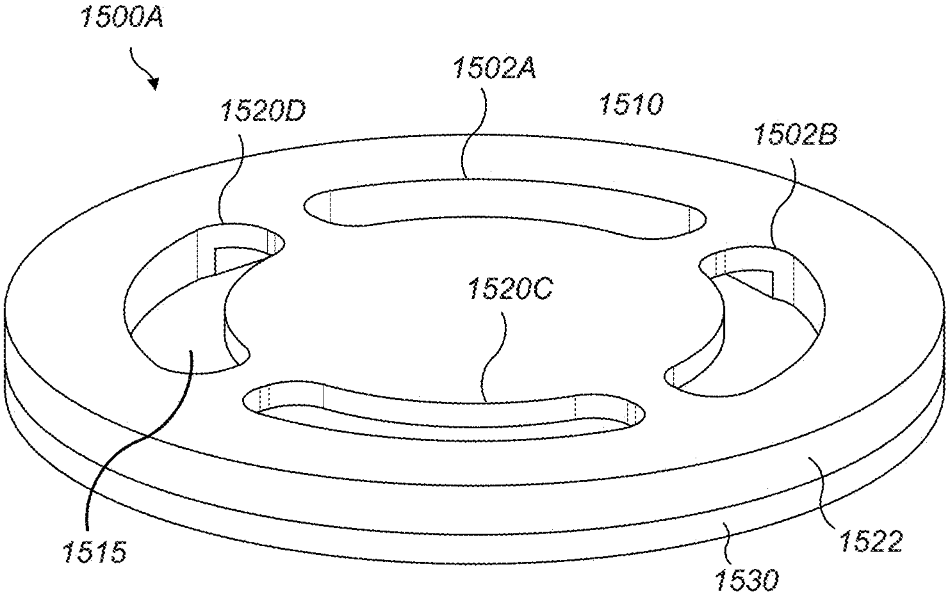
FIGS. 15A and 15B show a circular bilaminate transducer consisting of two structural layers.

Turning to FIG. 15A, shown is a schematic 1500A of a circular bilaminate transducer consisting of two structural layers 1522 1530 and an internal acoustic cavity 1515. The bottom layer is a plate 1530, the top layer is a plate 1522 with acoustic outlets 1520A 1520B 1520C 1520D removed from it.

Figure 15B:
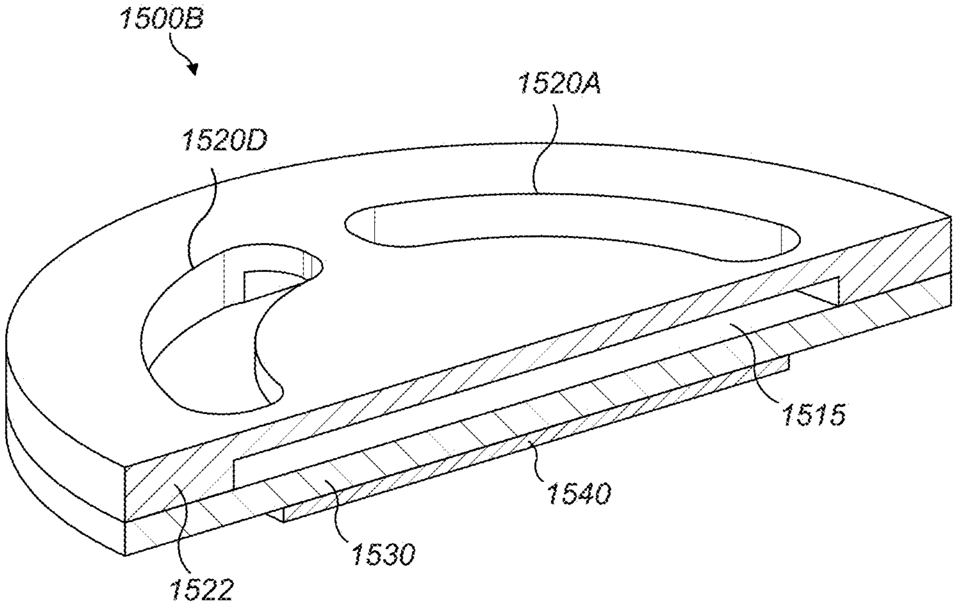

Turing to FIG. 15B, shown is a schematic 1500B of a cross-section of square bilaminate transducer consisting of two structural layers 1522 1530 and an internal acoustic cavity 1515. The bottom layer is a plate 1530, the top layer is a plate 1522 with acoustic outlets 1520A 1520D removed from it. A piezoelectric layer 1540 bonded to the bottom plate 1530.

Each design has one top plate that has had sections removed such that it defines acoustic outlets, and an internal air volume for an acoustic cavity. The top plate is attached to a second plate, which has a patch of a piezoelectric material adhered to its underside. In both cases the thickness, length and width of the two plates are comparable and therefore the stiffness of the plates are similar. Bonding two plates of similar stiffnesses together in this manner results in the displacements experienced by the top and bottom plate being strongly coupled when the piezoelectric layer is excited.

In the example configurations provided, the air cavity has been created by removing material from one plate. But the bilaminate transducer may instead be produced by forming two sheets into "C" sections, or removing material from both plates to form the internal cavity.

The geometry and material properties of the structure are designed such that the internal surfaces compress and expand the constrained air volume in a "breathing mode" that excites acoustic waves that constructively interfere within the internal air volume.

Figure 16A:
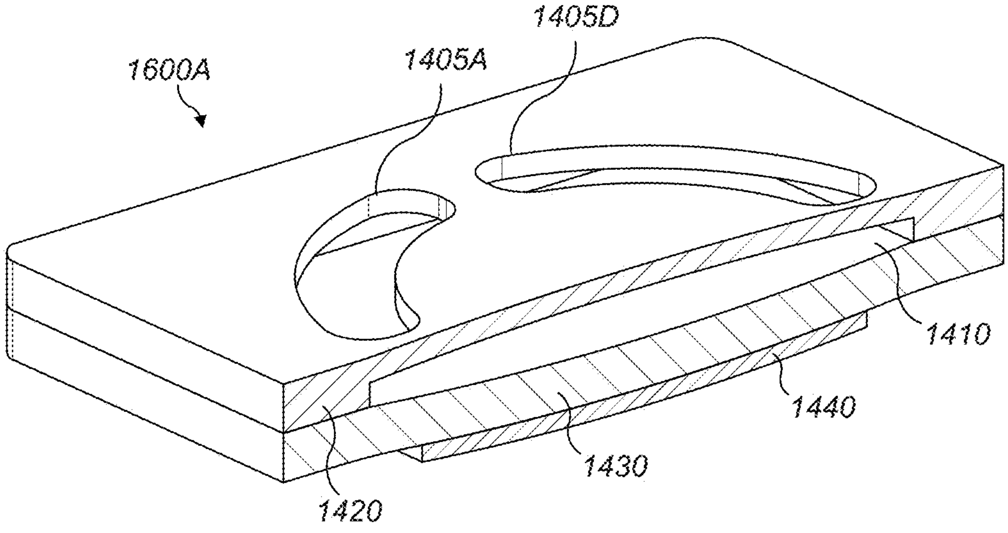
FIGS. 16A and 16B show the vibration mode of the bilaminate transducer shown in FIGS. 14A and 14B.
Figure 16B:
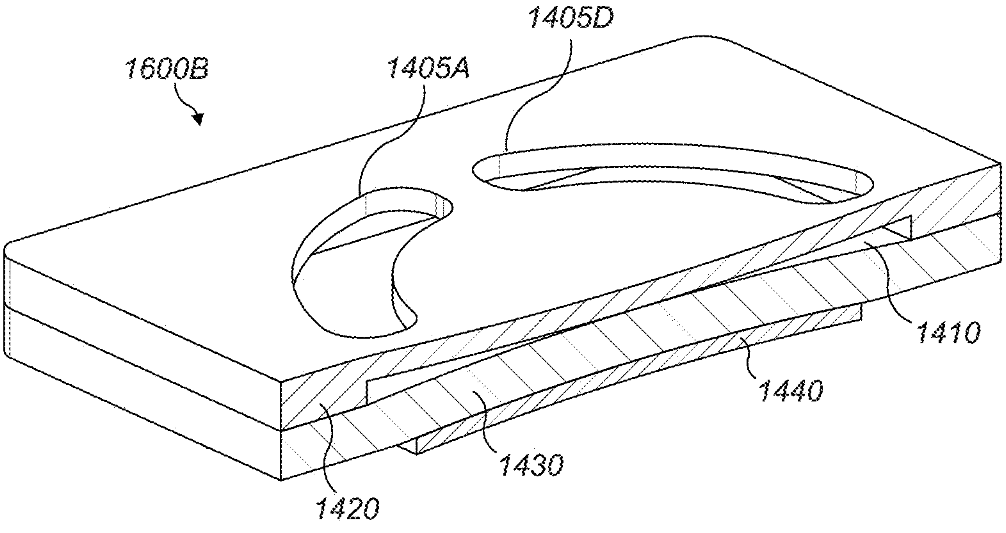
Figure 17:
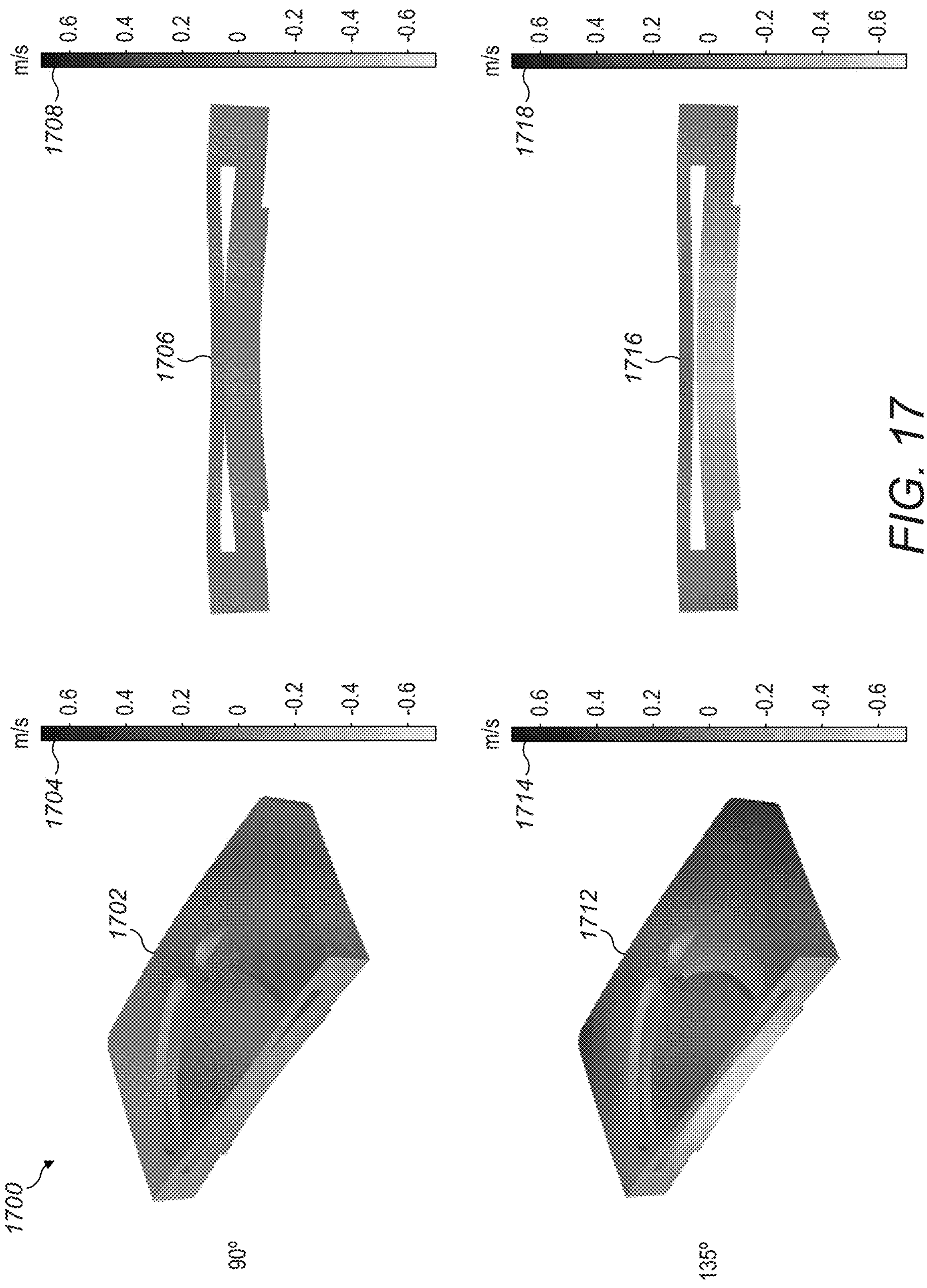
FIG. 17 shows a finite element model predicting the mode shape of the transducer construction shown in FIGS. 14A and 14B.
Figure 17:
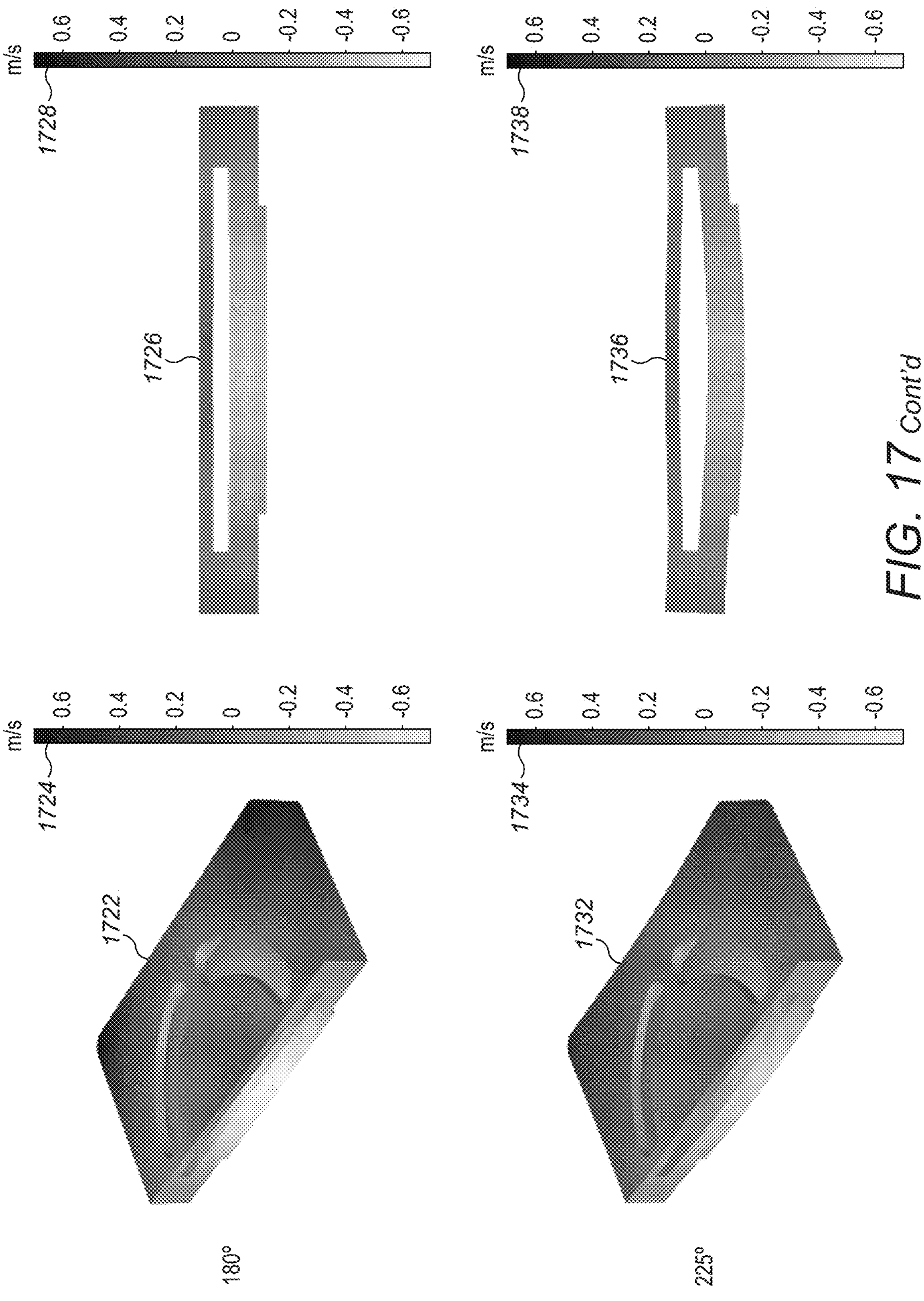
Figure 17:
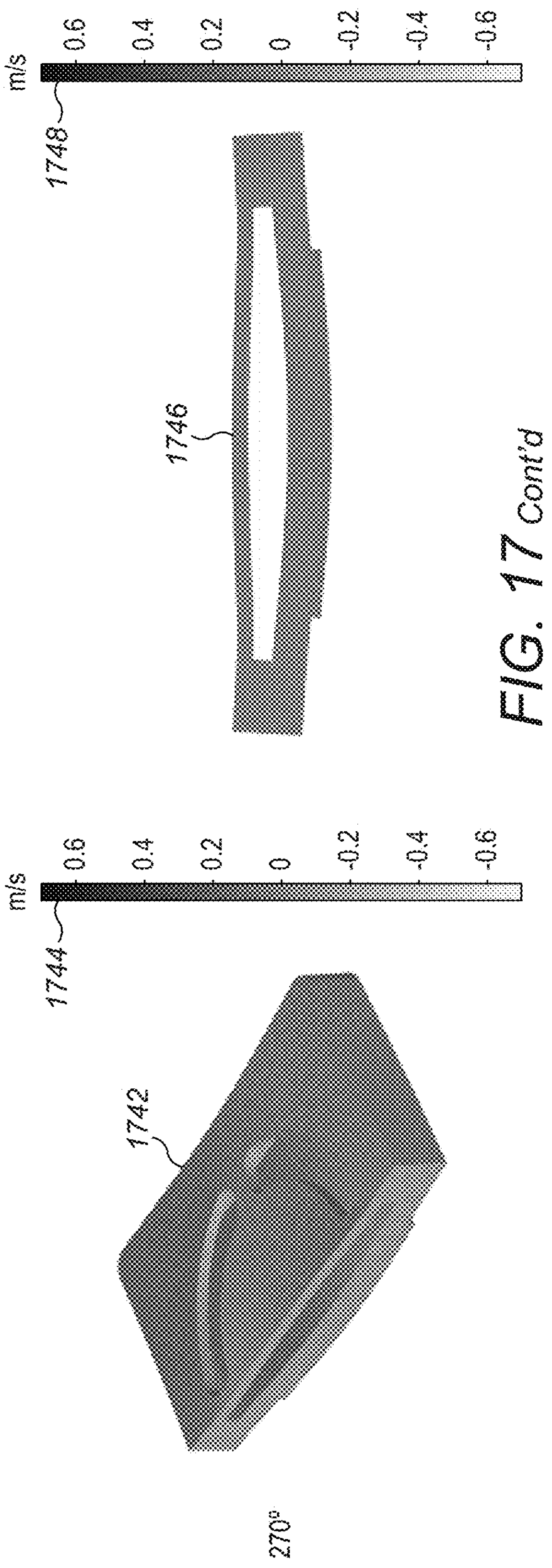
Figure 18A:
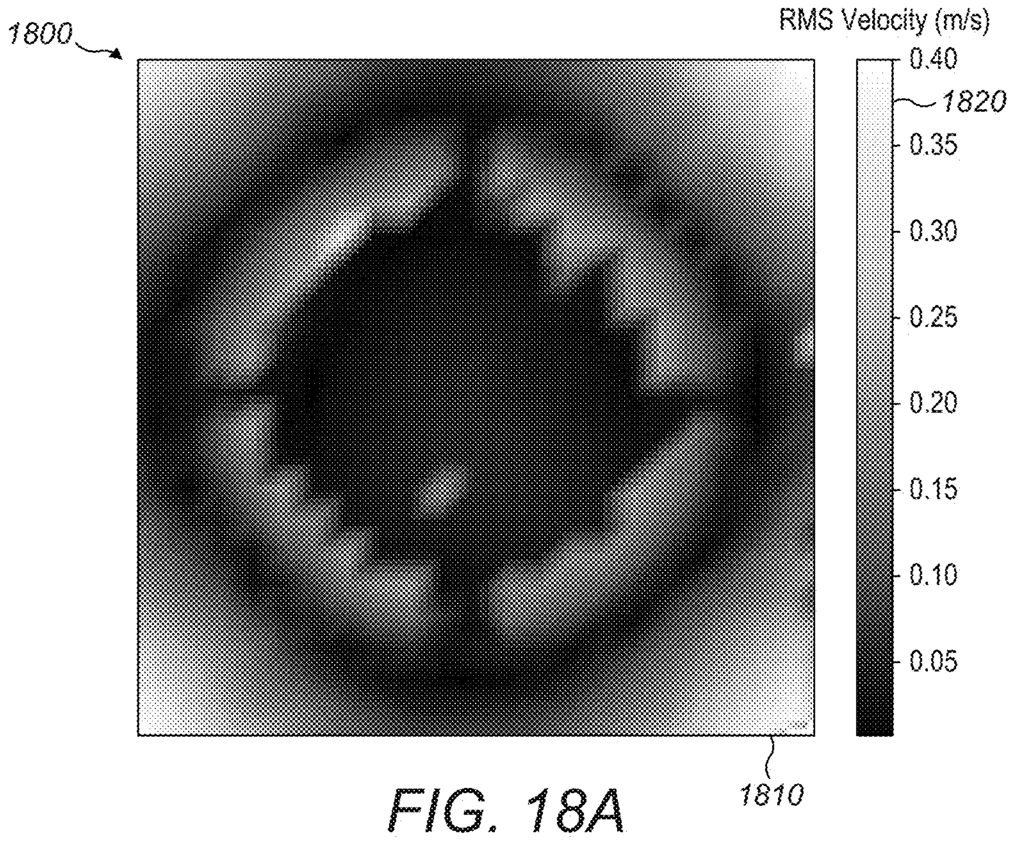
FIGS. 18A and 18B show a LDV measurement across the transducer shown in FIGS. 14A and 14B.
Figure 18B:
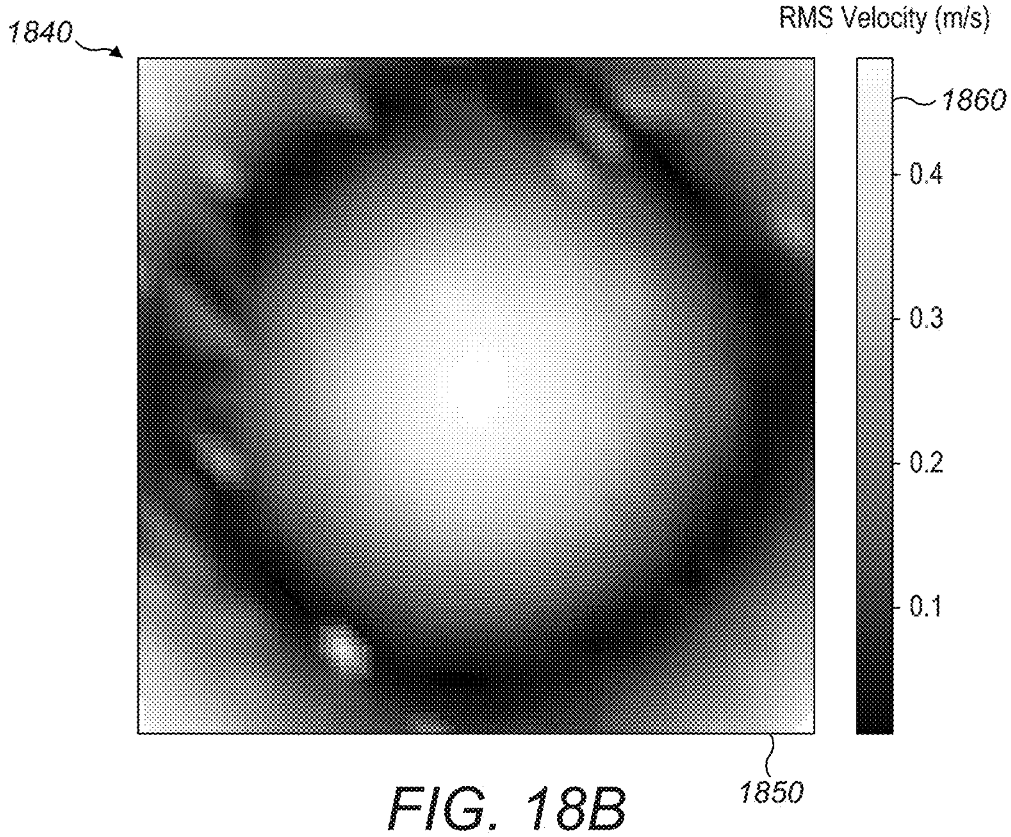

FIGS. 16A and 16B illustrate this deformation mode in an example configuration. FIG. 17 shows finite element simulations of the bilaminate transducer. FIGS. 18A and 18B show experimental LDV measurements of the velocity of the top and bottom surfaces of the same configuration.

FIGS. 16A and 16B are diagrams showing the vibration mode of the bilaminate transducer shown in FIGS. 14A and 14B. Turning to FIG. 16A, shown is a schematic 1600A of an angled cross section with cavity 1410 opening. Turning to FIG. 16B, shown is a schematic 1600B of an angled cross section with cavity 1410 closing. The deformation has been exaggerated for illustrative purposes.

FIG. 17 is a schematic 1700 of a finite element model predicting the mode shape of the transducer construction shown in FIGS. 14A and 14B. Images show the closing-to-opening cycle of the transducer at the given phase angles with a displacement scale factor of 125.

The first row shows an angled cross-section of transducer 1702 showing a velocity vector across the surface with a scale 1704 in m/s, and a cross section view along the center of the transducer 1706 showing the velocity vector with a scale 1708 in m/s, both at phase angle 90°.

The second row shows an angled cross-section of transducer 1712 showing a velocity vector across the surface with a scale 1714 in m/s, and a cross section view along the center of the transducer 1716 showing the velocity vector with a scale 1718 in m/s, both at phase angle 135°.

The third row shows an angled cross-section of transducer 1722 showing a velocity vector across the surface with a scale 1724 in m/s, and a cross section view along the center of the transducer 1726 showing the velocity vector with a scale 1728 in m/s, both at phase angle 180°.

The fourth row shows an angled cross-section of transducer 1732 showing a velocity vector across the surface with a scale 1734 in m/s, and a cross section view along the center of the transducer 1736 showing the velocity vector with a scale 1738 in m/s, both at phase angle 225°.

The fifth row shows an angled cross-section of transducer 1742 showing a velocity vector across the surface with a scale 1744 in m/s, and a cross section view along the center of the transducer 1746 with a scale 1748 showing the velocity vector in m/s, both at phase angle 270°.

Turning to FIG. 18A, shown is plot 1800 of a LDV measurement 1810 of the root mean square (RMS) velocity 1820 of the transducer structure shown on the external top surface in FIGS. 14A and 14B and whose mode shape is shown in FIGS. 16 and 17.

Turning to FIG. 18B, shown is a plot 1840 of a LDV measurement 1850 of the RMS velocity 1860 of the transducer structure shown on the external bottom surfaces in FIGS. 14A and 14B and whose mode shape is shown in FIGS. 16 and 17.

These results show that the transducer is designed such that the entire structure oscillates in a manner that excites the internal acoustic cavity, with the amplitude of vibrations of the top and bottom plates being of a comparable magnitude. The resonant frequency of the mechanical structure is tuned to the desired frequency by appropriate alteration of its geometric and material parameters.

The parameter sensitivities of the transducer may be estimated using the analytical solution for a circular isotropic plate. Equation 8 gives the analytical solution to the eigenmodes of a circular plate, where $\alpha_{mn}$ is an eigenvalue determined by the trial function and boundary conditions, h is the plate thickness, a is the plate radius, Y is the Young's modulus of the plate, v is the Poisson's ratio, and $\rho_p$ is the plate density.

$$f_{mn} = \frac{\alpha_{mn}^2 . h}{4\pi a^2} \sqrt{\frac{Y}{3(1 - v^2)\rho_D}} \quad \text{Eq. 8}$$

The complexity of the bilaminate transducer's structure means that Equation 8 can only be used to estimate the influence of parameters such as transducer diameter, thickness, and Young's modulus on the transducer's frequency response.

For maximum pressure generation, the mechanical structure is designed to oscillate in a "breathing mode" where the central regions of the top and bottom surfaces oscillate in anti-phase (as shown in FIGS. 16A, 16B, and 17). Vibrating in this manner compresses and reflects the air volume within the cavity, ensuring that the pressure generated by the top and bottom surfaces of the cavity are added constructively.

This design may also operate with alternative vibration modes. Such an alternative design will not be as effective if there is an alternative phase relationship between the top and bottom surfaces of the cavity, as the pressure generated by each surface would not sum as efficiently. Thus, a key feature of this design is the increase in volume velocity into the acoustic cavity obtained by exciting the internal surfaces with a mechanical resonance. Equation 9 gives the pressure generated by a rigid baffled piston, where $\rho_0$ is the density of air, f is the frequency of excitation, $U_0$ is the volume velocity, r is the distance from the piston, and D(φ) is the directivity function.

$$p(r, \varphi) = j.\rho_0.f.U_0 \frac{e^{-j.k.r}}{r} .D(\varphi) \quad \text{Eq. 9}$$

From Equation 9, it can be seen that the pressure generated by a vibrating surface is proportional to its volume velocity $U_0$. The bilaminate transducer works by exciting both the top and bottom surfaces of the transducer where this surface velocity pushes on the internal acoustic medium from multiple directions. This results in an effective increase in the volume velocity and generated pressure. A further consideration for the vibration mode is the presence of phase variation over the individual layers The optimal solution is achieved when the entire surfaces of the top and bottom plates oscillate in opposite phases with uniform phase over their surfaces. This vibration mode termed the "breathing mode" makes best use of the materials used to construct the transducer where the entire structure is working in unison to generate high acoustic pressure.

The transducer includes an internal acoustic cavity designed to match the mechanical resonance of the transducer. The cavity may be designed to be a certain fraction of a wavelength, such that the combination of the internal distances, location of cavity outlets, and wavelength of the generated sound pressure produce constructive interference and the generation of a standing wave resonance.

Alternatively, the design of the cavity may be based on a Helmholtz resonator where the acoustic mass in the outlets and acoustic compliance in cavities internal air volume are used to control the location of the acoustic resonant frequency. Equation 10 may be used to calculate the Helmholtz resonance of a cavity, with acoustic mass $M_A$, acoustic compliance $C_A$, and at an angular frequency of ω.

$$\omega = 1/\sqrt{M_A C_A} \quad \text{Eq. 10}$$

Either form of a cavity may be used to increase the pressure output of the transducer. The key feature of the cavity design presented herein is that the acoustic resonance is matched to the mechanical structure, and that the cavity is formed internally within the walls of the mechanical resonator.

The directivity pattern of the radiated acoustic field may be controlled by altering the locations and sizes of the cavity outlets. As the outer diameter or width of the outlets is increased, the generated sound field will become more directive. In addition to controlling the directivity pattern of the radiated sound field, the location of the outlets are important for setting the boundary conditions of the acoustic cavity. For maximum pressure generation, it is best for the outlets to be positioned such that they match the minimal regions of displacement. This results in the acoustic mode better matching the vibration mode of the mechanical structure.

Figure 19:
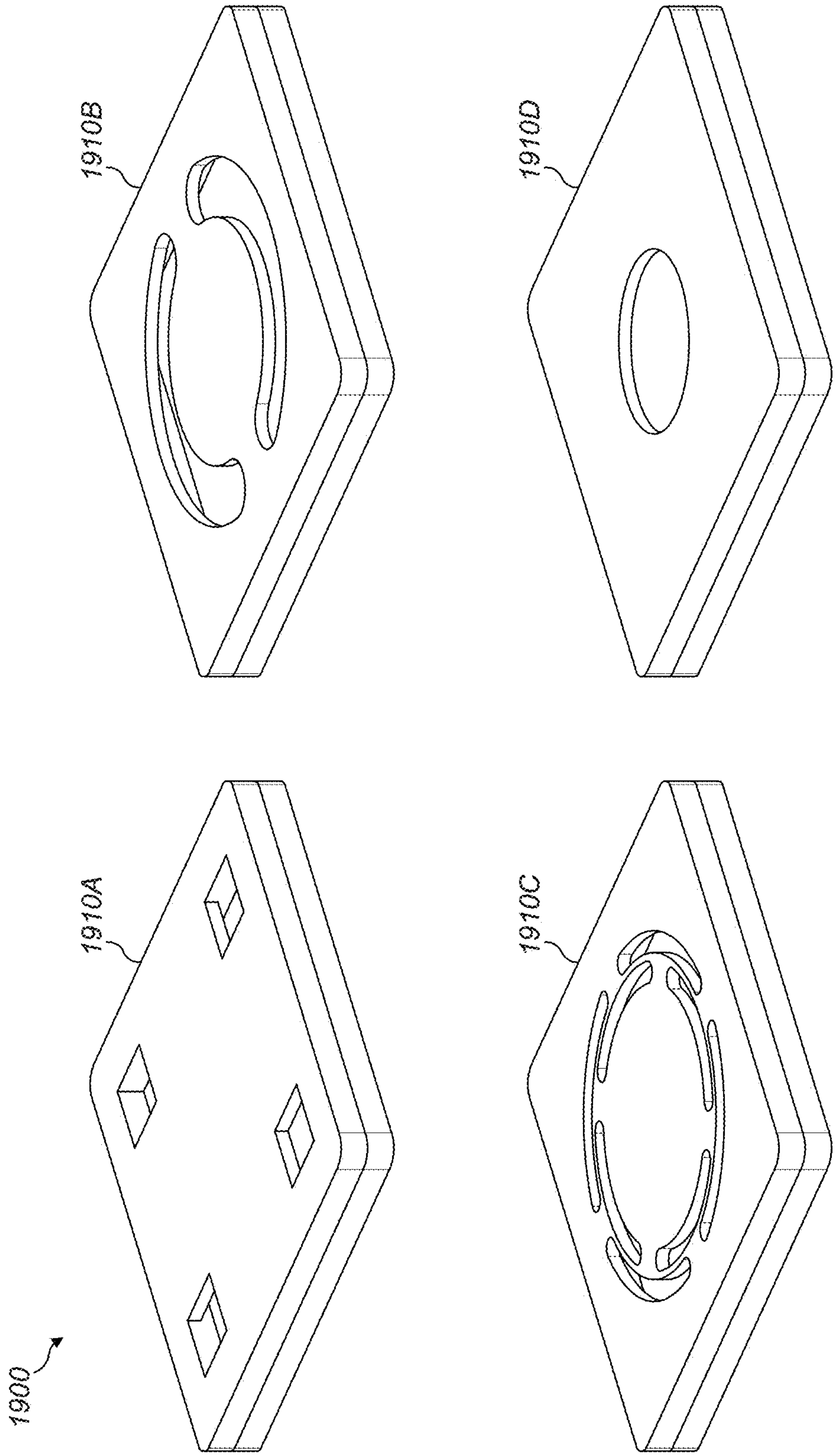
FIG. 19 shows diagrams of alternative configurations of the cavity outlets in a bilaminate transducer.

Turning to FIG. 19, shown is a schematic 1900 of diagrams each showing alternative configurations of the cavity outlet or outlets in the bilaminate transducer. A different style of configuration has been used in each case, namely: four small square cutouts 1910A; two semicircular cutouts 1910B; two sets of four quarter-circular cutouts 1910C; and a single circle cutout 1910D.

Figure 20:
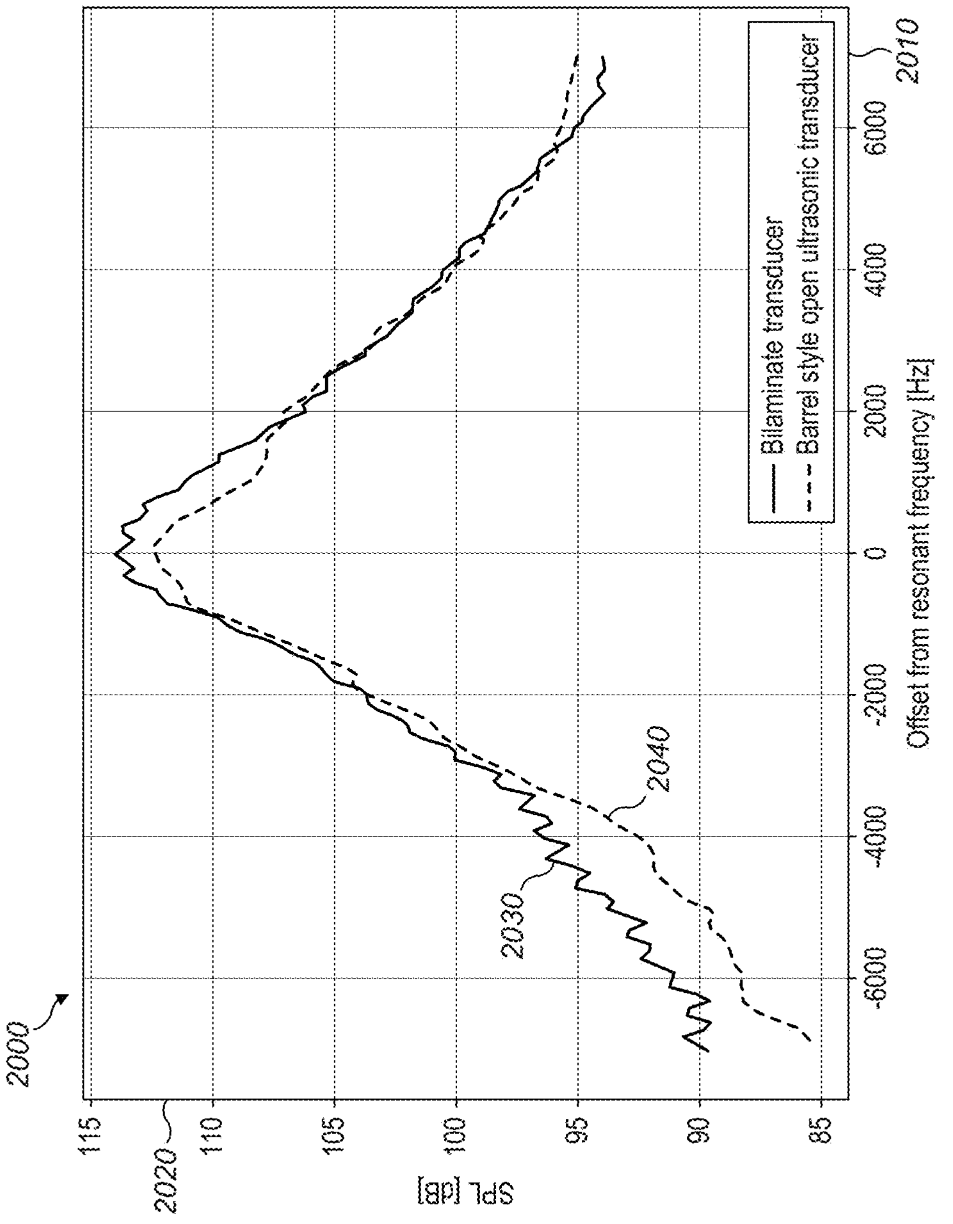
FIG. 20 shows plots of SPL of transducers.

Turing to FIG. 20, shown is a plot 2000 of the experimentally measured SPL in dB on the y-axis 2020 against an offset from resonant frequency in Hz on the x-axis 2010. The SPL generated by a bilaminate transducer (with the configuration shown in FIGS. 14A and 14B) is the sold line plot 2030. The SPL generated by the leading commercial barrel style open ultrasonic transducer at 300 mm on axis is the broken line plot 2040. Both were driven with 20 volts.

FIG. 20 demonstrates that high pressures are generated by the bilaminate transducer. The transducer is compared to the leading commercial barrel style open type ultrasonic transducer. Configuration of the bilaminate transducer (shown in FIGS. 14A and 14B) having a footprint area of 46 $mm^2$ generates 1.5 dB more SPL at resonance than the barrel style transducer which has a footprint area of 79 $mm^2$, when both are driven at resonance with a 20 V input signal. Given that the sound pressure generated by a vibrating surface is proportional to its surface area (Equation 9), this result demonstrates the effectiveness of the bilaminate transducer.

Figure 21A:
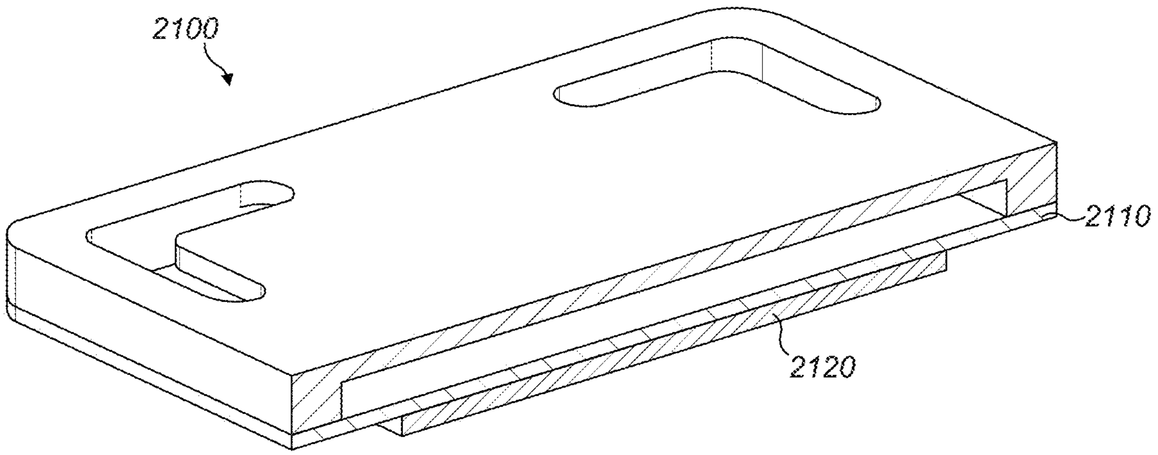
FIGS. 21A and 21B show cross-sections of a bilaminate transducer with piezoelectric material.
Figure 21B:
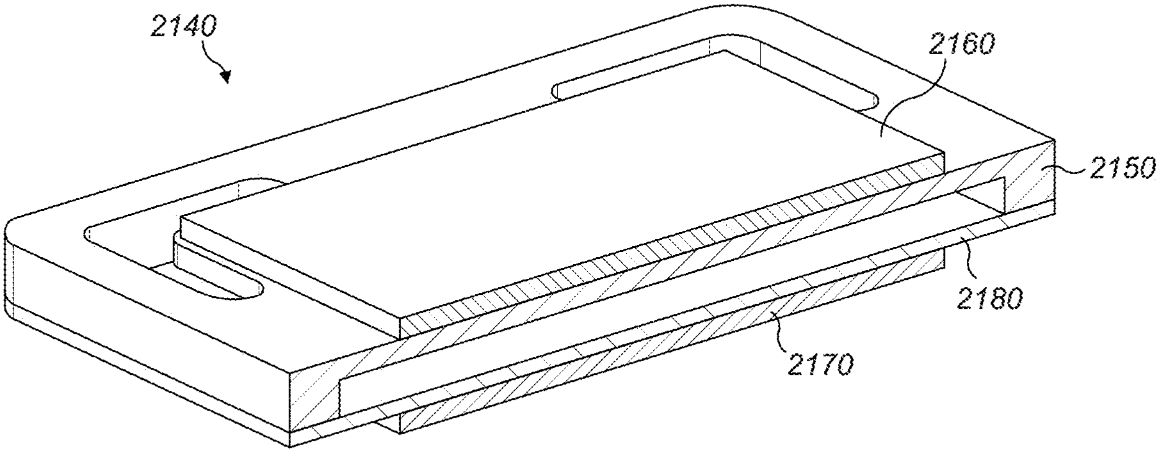
Figure 22A:
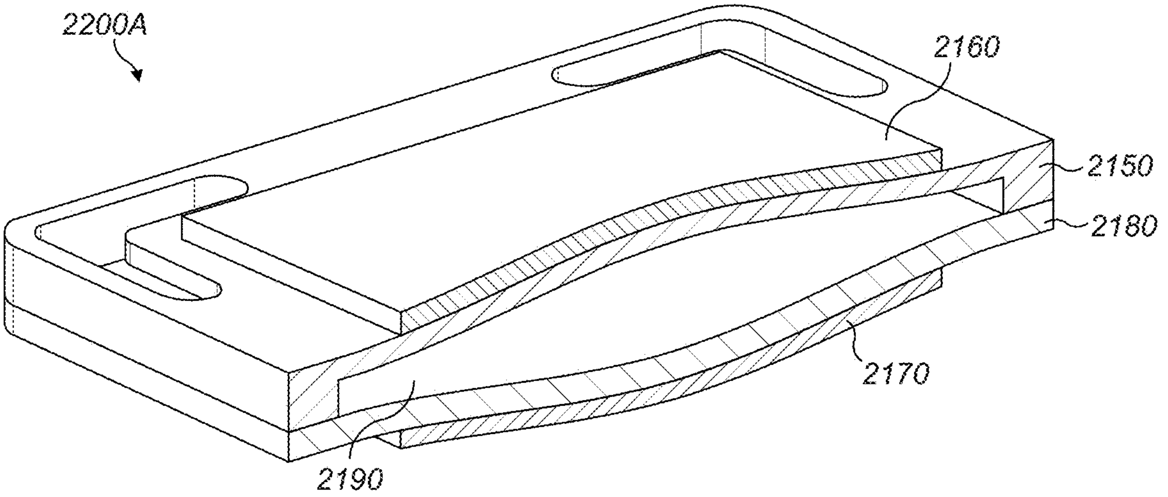
FIGS. 22A and 22B show the vibration mode of the bilaminate transducer shown in FIG. 21B.
Figure 22B:
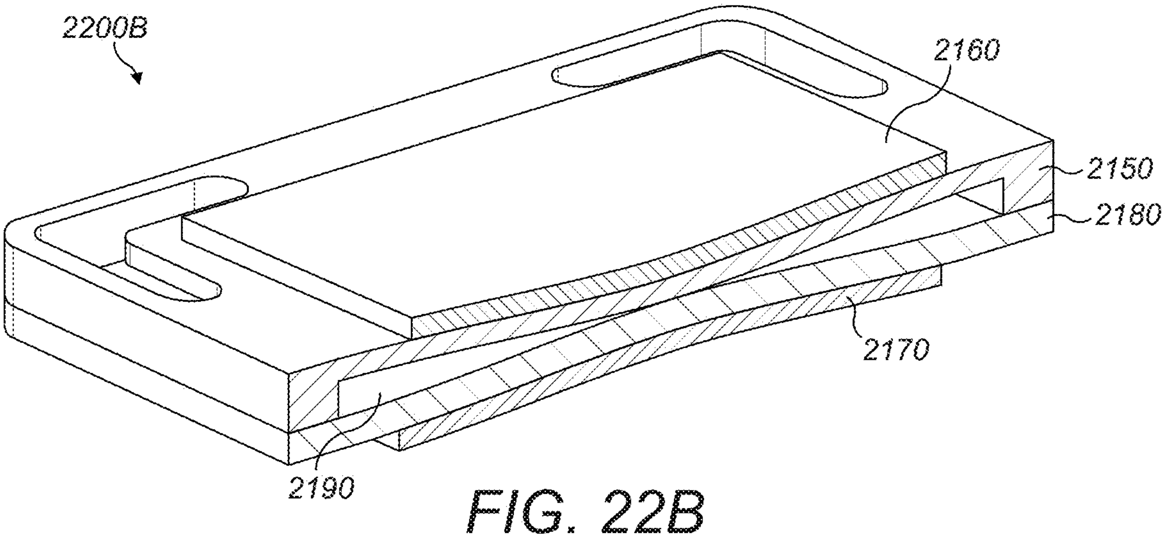
Figure 23:
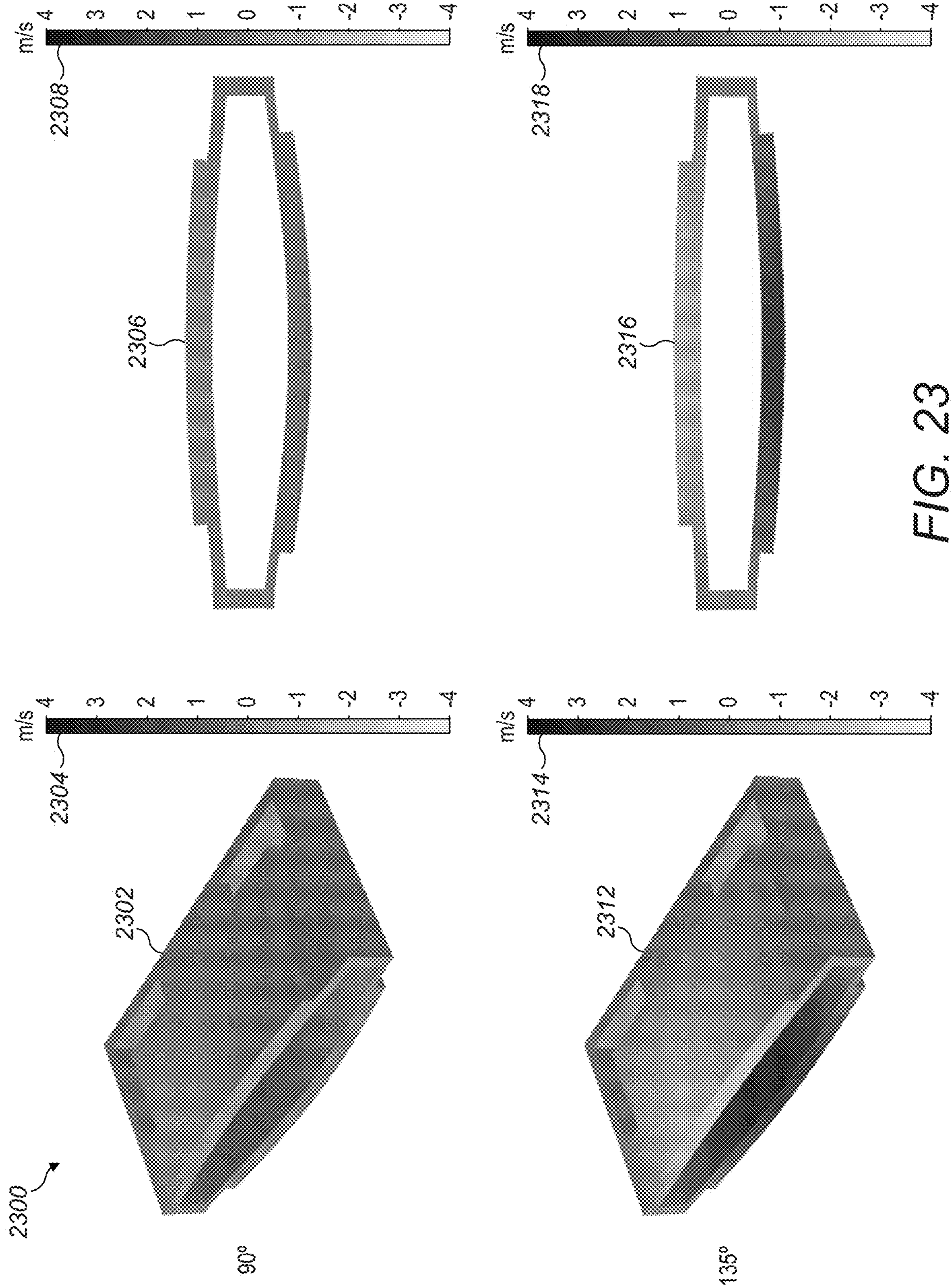
FIG. 23 shows a finite element model predicting the mode shape of the transducer construction shown in FIG. 21B.
Figure 23:
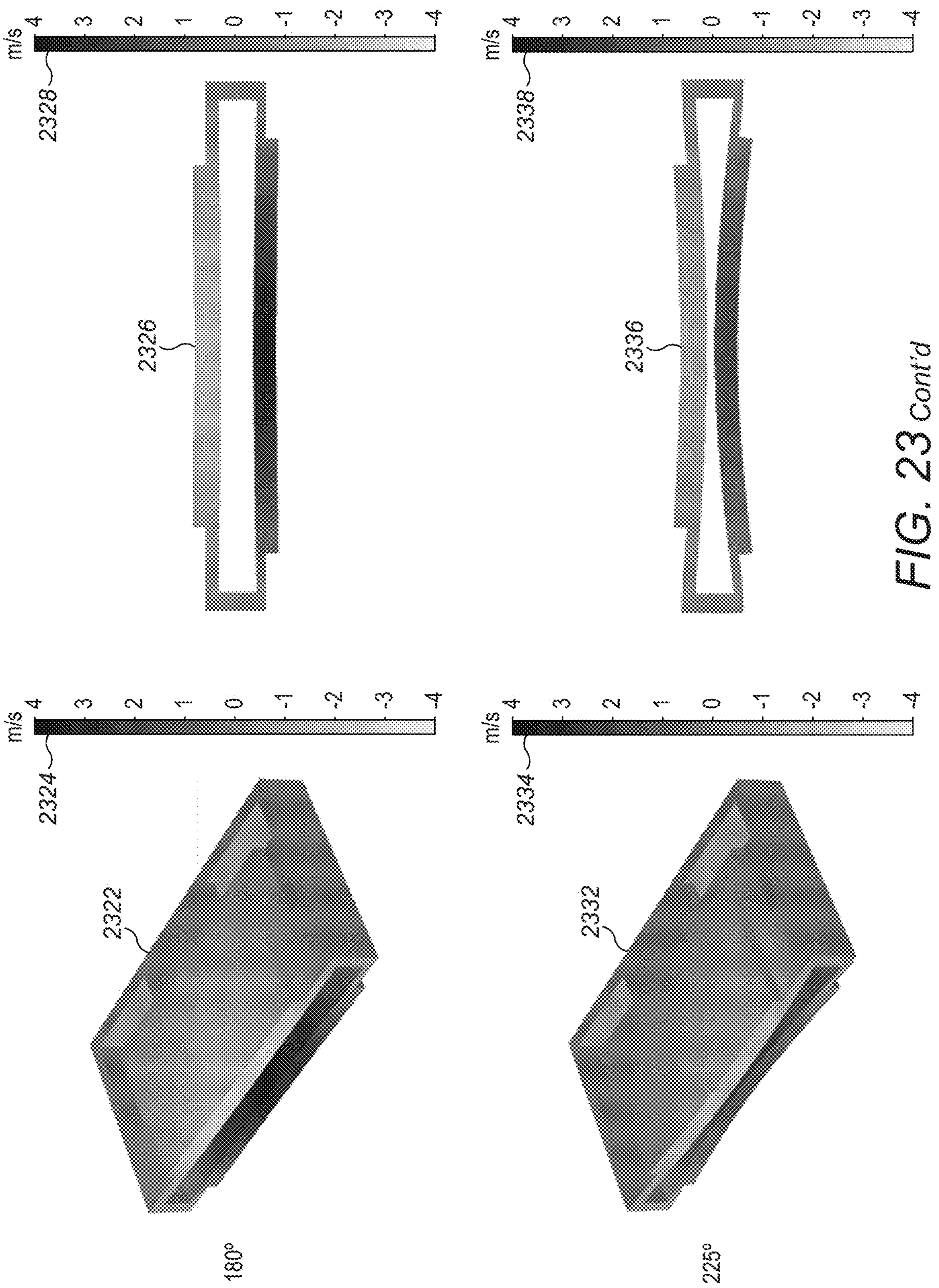
Figure 23:
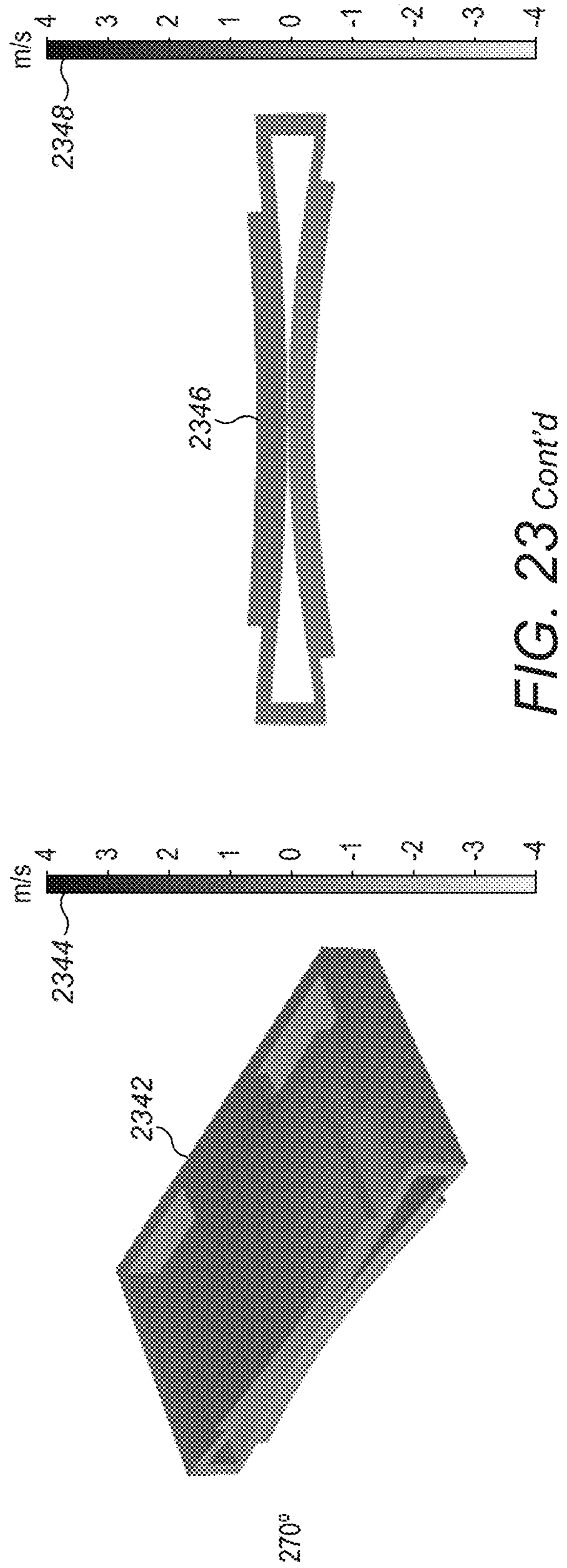

To further increase the pressure generated by the bilaminate transducer, a second layer of active material may be attached to the mechanical structure. FIGS. 21A and 21B show two example configurations that demonstrate how an additional layer of piezoelectric material may be placed onto the top plate to increase the power output. FIG. 21A shows a configuration with a single piezo of piezoelectric material attached to the bottom plate. FIG. 21B shows a resonator where piezoelectric layers have been added to the top and bottom plates of the structure. FIGS. 22A and 22B illustrate the intended "breathing mode" of the structure with an additional piezoelectric layer. FIG. 23 shows finite element predictions of the structure operating in the characteristic "breathing mode".

Turning to FIG. 21A, shown is a cross-section schematic 2100 of a bilaminate transducer with a single piece of piezoelectric material 2120 on the bottom plate 2110. Turning to FIG. 21B, shown is a cross-section schematic 2140 of a bilaminate transducer with two pieces of piezoelectric material: one piece 2160 on the top plate 2150, and a second piece 2170 on the bottom plate 2180.

FIGS. 22A and 22B are diagrams showing the vibration mode of the bilaminate transducer shown in FIG. 21B. Turning to FIG. 22A, shown is a schematic 2200A of an angled cross section with cavity 2190 opening. Turning to FIG. 22B, shown is a schematic 2200B of an angled cross section with cavity 2190 closing. The deformation has been exaggerated for illustrative purposes.

Turning to FIG. 23, shown is a finite element model 2300 predicting the mode shape of the transducer construction shown in FIG. 21B. Images show the opening to closing cycle of the transducer at the given phase angles with a displacement scale factor of 15.

The first row shows an angled cross-section of transducer 2302 showing a velocity vector across the surface with a scale 2304 in m/s, and a cross section view along the center of the transducer 2306 showing the velocity vector with a scale 2308 in m/s, both at phase angle 90°.

The second row shows an angled cross-section of transducer 2312 showing a velocity vector across the surface with a scale 2314 in m/s, and a cross section view along the center of the transducer 2316 showing the velocity vector with a scale 2318 in m/s, both at phase angle 135°.

The third row shows an angled cross-section of transducer 2322 showing a velocity vector across the surface with a scale 2324 in m/s, and a cross section view along the center of the transducer 2326 showing the velocity vector with a scale 2328 in m/s, both at phase angle 180°.

The fourth row shows an angled cross-section of transducer 2332 showing a velocity vector across the surface with a scale 2334 in m/s, and a cross section view along the center of the transducer 2336 showing the velocity vector with a scale 2338 in m/s, both at phase angle 225°.

The fifth row shows an angled cross-section of transducer 2342 showing a velocity vector across the surface with a scale 2344 in m/s, and a cross section view along the center of the transducer 2346 showing the velocity vector with a scale 2348 in m/s, both at phase angle 270°.

Figure 24A:
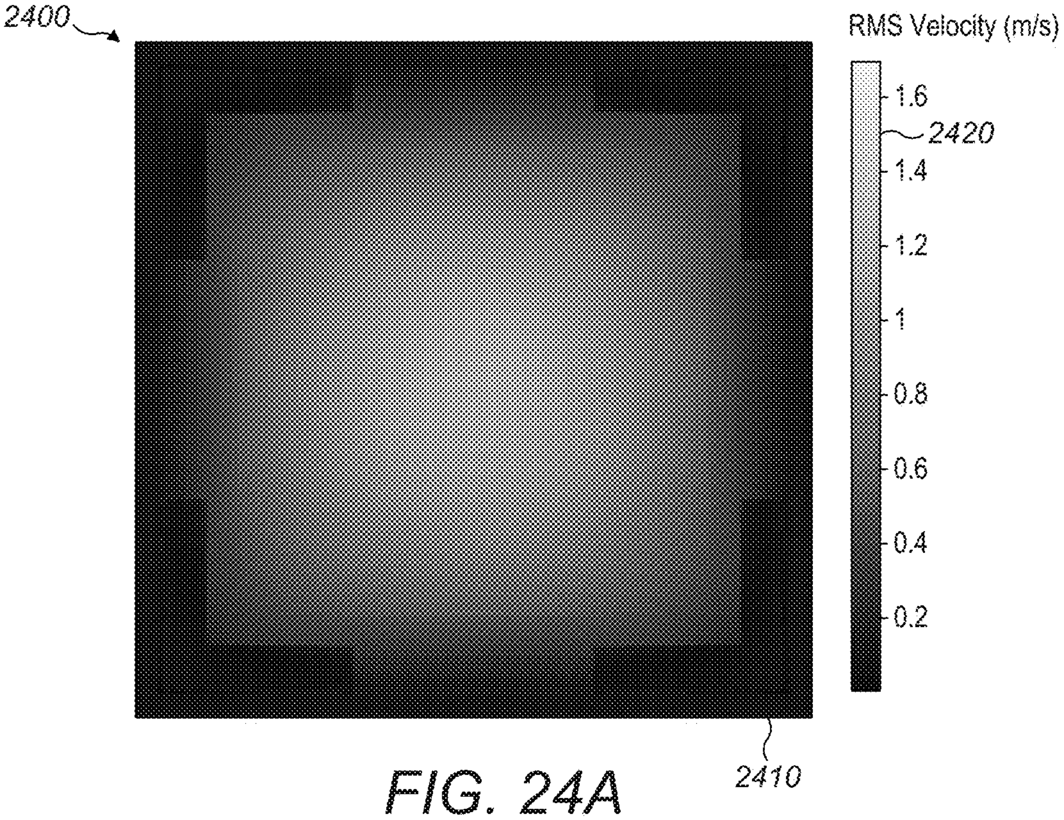
FIGS. 24A and 24B show LDV measurements across the transducer shown in FIG. 21B.

Turning to FIG. 24A, shown is plot 2400 of a LDV measurement 2410 of the root mean square (RMS) velocity 2450 of the transducer structure shown on the top external surface in FIG. 21B and whose mode shape is shown in FIGS. 22 and 23.

Figure 24B:
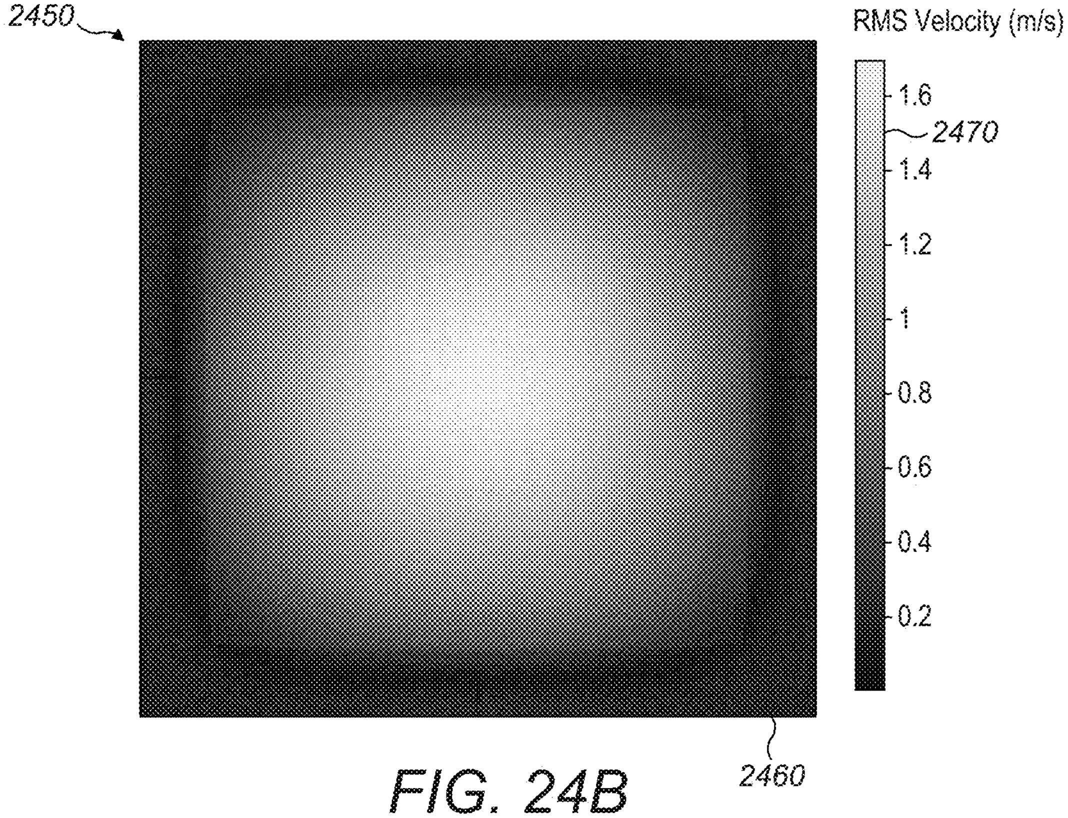

Turning to FIG. 24B, shown is plot 2450 of a LDV measurement 2460 of the root mean square (RMS) velocity 2470 of the transducer structure shown on the bottom external surface in FIG. 21B and whose mode shape is shown in FIGS. 22 and 23.

Note that the mode shape results in all of the internal surfaces working to expand and compress the acoustic cavity. The increase in pressure generation provided by the second layer of piezoelectric material is shown in the simulated responses plotted in FIG. 25.

Figure 25:
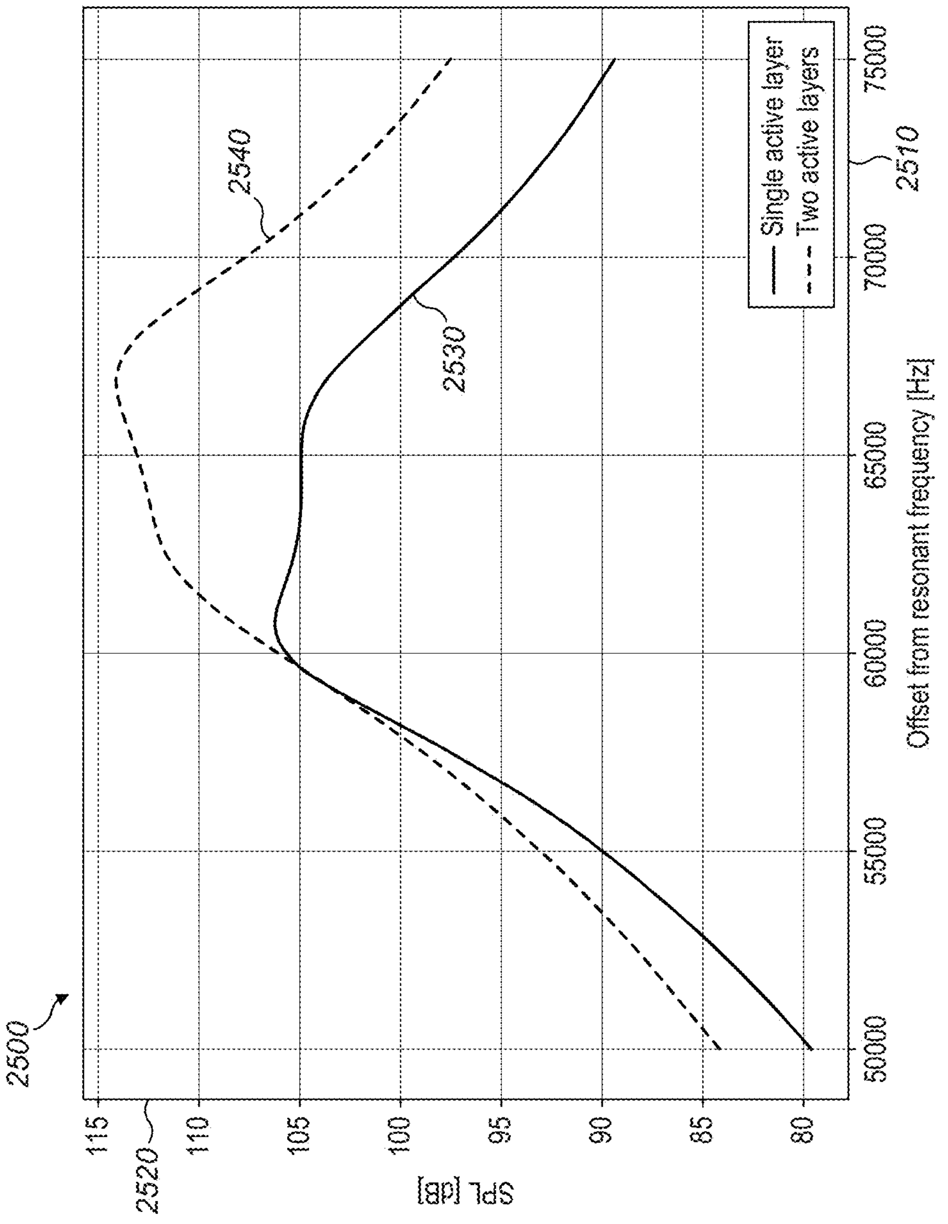
FIG. 25 shows plots of SPL of transducers.

Turning to FIG. 25, shown is a plot 2500 with simulated SPL in dB on the y-axis 2520 against offset from resonant frequency in Hz on the x-axis 2510. The sold line 2530 shows results generated by bilaminate transducers with a single layer of piezoelectric material (construction shown in FIG. 21A). The broken line 2540 shows results generated by bilaminate transducers with two layers of piezoelectric material (construction shown in FIG. 21B).

In the presented configuration with two piezoelectric layers (FIG. 21B), the size of one of the piezoelectric patches is limited by the location and size of the cavity outlets. An alternative structure may be constructed where the outlets of the cavity are located in the side walls, which removes the constraint the outlets in the top plate placed on the size of the additional active material.

In general, the bilaminate transducer may be described as consisting of two plates whose surface vibrations are of a comparable magnitude. The plates are located either side of an acoustic cavity, which is formed by the air volume constrained between both plates. The bilaminate transducer may be designed to resonate at a desired resonant frequency by controlling the geometrical and material properties of the plates.

Figure 26:
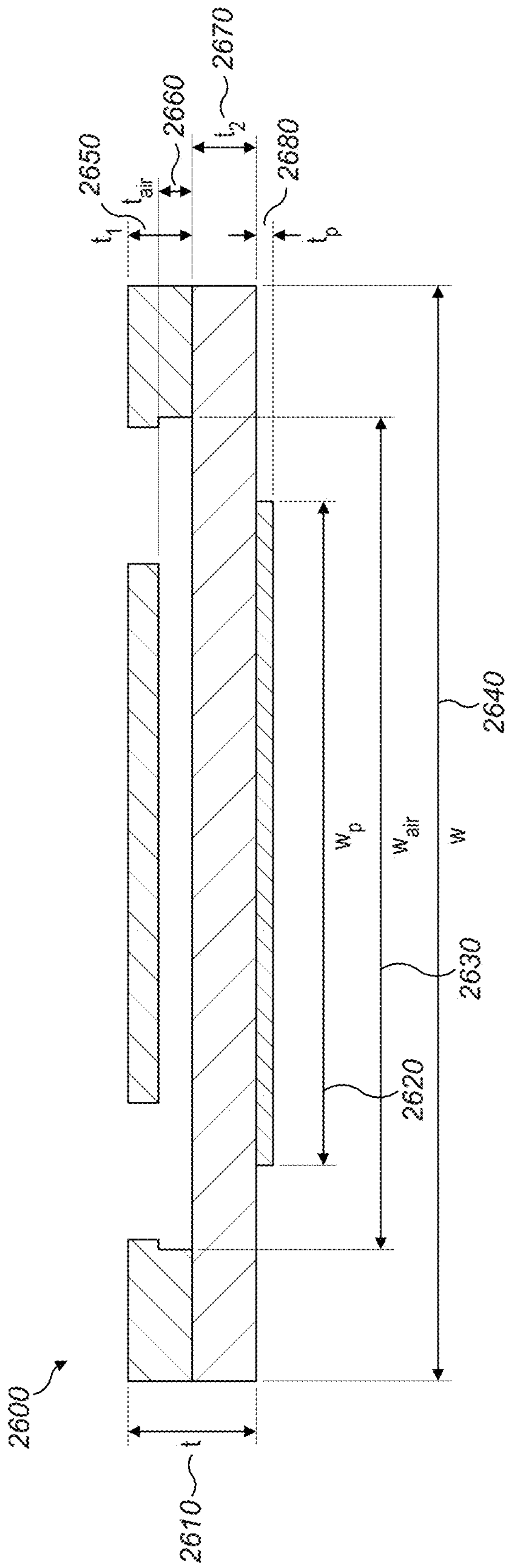
FIG. 26 shows geometrical parameters in an example configuration of a bilaminate transducer.

FIG. 26 shows a labelled diagram of bilaminate transducer's cross-section.

Turning to FIG. 26, shown is a diagram 2600 showing the geometrical parameters in an example configuration of the bilaminate transducer. These parameters include: total plate thickness t 2610; top plate thickness $t_1$ 2650; substrate thickness $t_2$ 2670; cavity thickness $t_{air}$ 2660; active material thickness $t_p$ 2680; total width w 2640; cavity width $w_{air}$ 2630; and active material width $w_p$ 2620.

Table 3 shows some example configurations relevant to ultrasonic mid-air haptics.

TABLE 3

| Parameter | t | w | $t_2$ | $t_1$ | $w_{air}$ | $t_{air}$ | $w_p$ | $t_p$ |
|---|---|---|---|---|---|---|---|---|
| Parameter description | Total plate thickness | Total width | Substrate thickness | Top plate thickness | Cavity width | Cavity thickness | Active material width | Active material thickness |
| Units | [mm] | [mm] | [mm] | [mm] | [mm] | [mm] | [mm] | [mm] |
| 40 kHz transducer | 1.20 | 10.00 | 0.50 | 0.70 | 8.5 | 0.35 | 8.0 | 0.2 |
| 60 kHz transducer | 0.76 | 6.60 | 0.38 | 0.38 | 5.00 | 0.20 | 4.0 | 0.1 |

The transducer geometry in each case has been optimized for a different resonant frequency. FIG. 26 shows each parameter labelled on a transducer cross-section.

Table 4 shows some aspect ratios relevant to mid-air haptics.

TABLE 4

| Parameter | $f_{res}$ | t | w | $t_2$ | $t_1$ | $w_{air}$ | $t_{air}$ | $w_p$ | $t_p$ |
|---|---|---|---|---|---|---|---|---|---|
| Parameter description | Transducer resonant frequency | Total plate thickness | width | Substrate thickness | Top plate thickness | Cavity width | Cavity thickness | Width active material | Thickness active material |
| High aspect ratio | 40 kHz | t | 24t | 0.29t | 0.71t | 20.6t | 0.29t | 17.2t | 0.40t |
| Medium aspect ratio | 60 kHz | t | 8.7t | 0.5t | 0.5t | 6.6t | 0.26 t | 5.3t | 0.13t |
| Low aspect ratio | 100 kHz | t | 4.2t | 0.53t | 0.47t | 3.2t | 0.18t | 3.4t | 0.22t |

Table 4 shows examples of possible aspect ratios of bilaminate transducers. Possible exemplar values oft may be described such as high aspect ratio t=0.175 mm, medium aspect ratio t=0.76 mm, low aspect ratio t=1.9 mm. The parameters are labelled in FIG. 26. Table 4 thus shows that the resonant frequency of the transducer may be altered by adjusting the aspect ratio of the lengths and thicknesses in the transducer.

The transducer is said to be a bilaminate transducer when the external surfaces of the transducer vibrate with significant amplitude. Equation 11 defines an inequality which can be used to identify whether the top external surface oscillates with sufficient magnitude.

$$|u_1|>0.05 m/s \qquad \text{Eq. 11}$$

Here, $u_1$ is the maximum amplitude of velocity of the top external surface of the transducer when the transducer is driven with a 10 Volt sine wave electrical signal. Note that in devices that include an acoustic grille or cover, the external surfaces are defined as those which are mechanically bonded to, and form part of, the mechanical resonator, The surfaces of the cover or case that surround the resonator are not included.

Equation 12 provides the ratio of the amplitudes of the velocities of the external top and bottom surfaces of the transducer. A transducer may be considered a bilaminate transducer when it meets either of the inequalities defined in Equations 11 and 12.

$$\left|\frac{u_1}{u_2}\right| > 0.1 \qquad \text{Eq. 12}$$

Here, $u_1$ is a maximum amplitude of velocity of the first transducer plate top when the acoustic transducer system is driven with a 10-Volt sine wave electrical signal; and $u_2$ is a maximum amplitude of velocity of the second transducer plate bottom when the acoustic transducer system is driven with a 10-Volt sine wave electrical signal. This definition of $u_1$ and $u_2$ assumes that it is the bottom surface $u_2$ that has an active material bonded to it. If the active material is instead bonded to the top surface, then the ratio should be reversed to $$\left|\frac{u_2}{u_1}\right|.$$

In configurations where the active material is used on both surfaces, the definition is arbitrary. In a same way as with the top surface, the bottom surface of the transducer must be part of the resonant structure and should not include additional layers of material that are used to encase or protect the transducer.

All potential embodiments of the bilaminate transducer have external surfaces that undergo significant deformation. Examples of these are the surface velocity plots showing different mode shapes are in FIGS. 18A, 18B, 24A, and 24B. Both embodiments satisfy Equations 11 and Equation 12, and are thus considered to be bilaminate transducers. This characteristic may make it challenging to attach a bilaminate transducer to a parent structure such as an acoustic array. Bonding the bilaminate transducer directly to a rigid layer results in additional mechanical impedance being applied to the transducer, either through the addition of mass or stiffness, or obstruction of the plate's motion. This in turn results in a reduction of the transducer's performance through additional unwanted energy losses. The bilaminate transducer therefore should be mounted in a manner that minimizes excess mechanical impedance being applied to the transducer.

One such example is the design disclosed in Chilles et al., which provides an approach for mounting transducers whose outer body undergoes significant deformation that results in minimal transducer performance losses. Thus may apply for some modes shape such as in FIGS. 18A and 18B. For transducers with alternative mode shapes, such as that shown in FIGS. 24A and 24B, the bilaminate transducer may simply be supported or clamped on the edges, which are regions of minimal vibration amplitude. This will not affect the mechanical impedance enough to change its output.

The bilaminate transducer maximizes the radiating area of the transducer by resonating its entire body rather than a single diaphragm. This is particularly relevant to applications such as ultrasonic mid-air haptics, where an array of transducers is used to generate locally high regions of pressure that may be felt and perceived by a user in mid-air. Constructing an array of bilaminate transducers may enable the total size and cost of ultrasonic mid-air haptic systems to be reduced by reducing the size of the array and number of transducers required to generate the required pressure.

In addition to having benefits for mid-air haptics, the bilaminate transducer may also be used in range finding applications. The superior pressure per volt of the bilaminate transducer when compared with the market leading barrel-type transducer (shown in FIG. 20) translates to a greater sensitivity and greater range when the transducers are used to measure distances.

Potential points of novelty may include:

Designing an acoustic resonator which excites an internal cavity by resonating the entire structure rather than just a single layer within the transducer housing.

Maximizing the radiating area of the transducer through identification of a novel transducer structure.

Identification of a vibration mode that enables both the top and bottom walls of the cavity to work together to generate high acoustic pressure.

Novel mechanical structure that differs from any existing acoustic transducer.

Development of numerical models to optimize a complex mechanical-acoustic transducer.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:

a flexible transducer mount, comprising:

an acoustic transducer having an outer surface and a top;

a flexible circuit, the flexible circuit having at least one flexible arm, wherein the at least one flexible arm makes an electrical connection with the acoustic transducer;

a support having a first stiffness, the support providing support for the acoustic transducer;

a material having a second stiffness lower than the first stiffness, the material adhered to the acoustic transducer and the support such that, when the outer surface of the acoustic transducer oscillates, vibrations of the acoustic transducer are decoupled from the support; and wherein at least one of the at least one flexible arm comprises a conductive trace.

2. The device as in claim 1, wherein the flexible transducer mount comprises cut-out regions.

3. The device as in claim 1, wherein at least one of the at least one flexible arm comprises an exposed conductive connection point at the end of the at least one flexible arm.

4. The device as in claim 1, further comprising:

a flexible printed circuit board that supports the acoustic transducer.

5. The device as in claim 1, further comprising:

a protective grille overlaid over the top of the acoustic transducer.

6. The device as in claim 1, wherein when the outer surface of the acoustic transducer oscillates, amplitude of vibrations of the acoustic transducer is substantially minimized at substantially a nodal ring of the acoustic transducer.

7. The device as in claim 6, wherein the material is positioned to substantially sit along the nodal ring.

8. The device as in claim 6, wherein at least one of the at least one flexible arms substantially sits along the nodal ring.

9. The device as in claim 1, wherein the flexible transducer mount is fabricated in a panelized form.

10. The device as in claim 1, wherein the flexible transducer mount comprises piezoelectric material.

11. A device comprising:

an acoustic transducer system, comprising:

a first transducer plate having a first transducer plate top, a first transducer plate bottom and a first stiffness;

a second transducer plate having a second transducer plate top, a second transducer plate bottom, and a second stiffness;

an internal acoustic cavity within at least one of the first transducer plate and the second transducer plate;

a first piezoelectric layer having a first piezoelectric layer top;

wherein the second transducer plate top is bonded to the first transducer plate bottom;

wherein the first piezoelectric layer top is bonded to the second transducer plate bottom;

wherein a difference between the first stiffness and the second stiffness is less than a threshold amount; and wherein the internal acoustic cavity has an internal acoustic resonance coinciding with a system acoustic resonance of the acoustic transducer system.

12. The device as in claim 11, further comprising:

a second piezoelectric layer having a second piezoelectric layer bottom; and wherein the second piezoelectric layer bottom is bonded to the first transducer plate top.

13. The device as in claim 11, wherein the internal acoustic cavity is within the first transducer plate.

14. The device as in claim 13, wherein the first transducer plate includes at least one cutout region.

15. The device as in claim 11, wherein the internal acoustic cavity is within the first transducer plate and the second transducer plate.

16. The device as in claim 11, wherein the first transducer plate and the second transducer plate are substantially rectangular.

17. The device as in claim 11, wherein the first transducer plate and the second transducer plate are substantially circular.

18. The device as in claim 11, wherein the internal acoustic resonance coinciding with the system acoustic resonance of the acoustic transducer system satisfies:

$$|u_1|>0.05\text{ m/s};$$

where $u_1$ is a maximum amplitude of velocity of the first transducer plate top when the acoustic transducer system is driven with a 10-Volt sine wave electrical signal.

19. The device as in claim 11, wherein the internal acoustic resonance coinciding with the system acoustic resonance of the acoustic transducer system satisfies:

$$\left|\frac{u_1}{u_2}\right| > 0.1$$

where $u_1$ is a maximum amplitude of velocity of the first transducer plate top when the acoustic transducer system is driven with a 10-Volt sine wave electrical signal; and $u_2$ is a maximum amplitude of velocity of the second transducer plate bottom when the acoustic transducer system is driven with a 10-Volt sine wave electrical signal.

20. The device as in claim 11, wherein the first transducer plate top has a first transducer plate top central region;

wherein the second transducer plate bottom has a second transducer plate bottom central region; and wherein the first transducer plate top central region and the second transducer plate bottom central region oscillate in anti-phase.

* * * * *